United States Patent
Mousseau et al.

(10) Patent No.: US 7,075,511 B1
(45) Date of Patent: Jul. 11, 2006

(54) VEHICLE INTERIOR REARVIEW MIRROR ASSEMBLY WITH DISPLAY

(75) Inventors: Rick Mousseau, Holland, MI (US);
Barry W. Hutzel, Holland, MI (US);
Darry P. DeWind, Holland, MI (US)

(73) Assignee: Donnelly Corporation, Holland, MI (US)

( * ) Notice: Subject to any disclaimer, the term of this patent is extended or adjusted under 35 U.S.C. 154(b) by 730 days.

(21) Appl. No.: 09/699,780

(22) Filed: Oct. 30, 2000

Related U.S. Application Data

(63) Continuation-in-part of application No. 09/663,036, filed on Sep. 15, 2000, now Pat. No. 6,520,667.

(51) Int. Cl.
*G09G 5/00* (2006.01)

(52) U.S. Cl. .................. 345/156; 345/22; 359/838

(58) Field of Classification Search ............ 345/32–33; 359/565, 566, 509, 504, 872, 875, 838, 846, 359/871; 562/494; 340/815.4
See application file for complete search history.

(56) References Cited

U.S. PATENT DOCUMENTS

| | | | |
|---|---|---|---|
| 4,807,096 A | 2/1989 | Skogler et al. | 362/142 |
| 4,882,565 A | 11/1989 | Gallmeyer | 340/461 |
| 4,948,242 A | 8/1990 | Desmond et al. | 350/637 |
| 5,122,647 A | 6/1992 | Lynam et al. | 250/201.1 |
| 5,178,448 A | 1/1993 | Adams et al. | 362/83.1 |
| 5,285,060 A | 2/1994 | Larson et al. | 250/214 AL |
| 5,406,414 A | 4/1995 | O∝Farrell et al. | 359/604 |
| 5,530,240 A | 6/1996 | Larson et al. | 250/214 AL |
| 5,576,687 A | 11/1996 | Blank et al. | 340/438 |
| 5,649,756 A | 7/1997 | Adams et al. | 362/83.1 |
| 5,669,698 A | 9/1997 | Veldman et al. | 362/83.1 |
| 5,671,996 A * | 9/1997 | Bos et al. | 362/488 |
| 5,673,994 A | 10/1997 | Fant, Jr. et al. | 362/831 |
| 5,708,410 A | 1/1998 | Blank et al. | 340/438 |
| 5,786,772 A | 7/1998 | Schofield et al. | 340/903 |
| 5,796,094 A | 8/1998 | Schofield et al. | 250/208.1 |
| 5,813,745 A | 9/1998 | Fant, Jr. et al. | 362/83.1 |
| 5,820,097 A | 10/1998 | Spooner | 248/549 |
| 5,820,245 A | 10/1998 | Desmond et al. | 362/83.1 |
| 5,929,786 A | 7/1999 | Schofield et al. | 340/903 |
| 5,938,321 A | 8/1999 | Bos et al. | 362/494 |
| 5,956,181 A * | 9/1999 | Lin | 359/630 |
| 5,971,552 A | 10/1999 | O'Farrell et al. | 359/871 |
| 6,000,823 A | 12/1999 | Desmond et al. | 362/494 |
| 6,005,538 A | 12/1999 | Hoekstra | 345/47 |
| 6,042,253 A | 3/2000 | Fant, Jr. et al. | 362/494 |

(Continued)

OTHER PUBLICATIONS

U.S. Appl. No. 09/449,121, filed Nov. 24, 1999, entitled Rearview Mirror Assembly with Utility Functions.

(Continued)

*Primary Examiner*—Alexander Eisen
(74) *Attorney, Agent, or Firm*—Van Dyke, Gardner, Linn & Burkhart, LLP

(57) ABSTRACT

A vehicle rearview mirror system for a vehicle includes a rearview mirror case, which is adapted to mount to a vehicle, and a reflective element. The mirror system further includes a carrier, which has at least either a display screen or a user-actuatable interface device, such as a user-actuatable button. The carrier is mechanically connected to the mirror case, for example by a snap-fit connection, whereby the mirror system is easier to assemble and optionally provides for a removable carrier for replacement, repair or upgrade.

57 Claims, 17 Drawing Sheets

U.S. PATENT DOCUMENTS

| | | | |
|---|---|---|---|
| 6,087,953 A | | 7/2000 | DeLine et al. ............ 340/815.4 |
| 6,106,121 A | * | 8/2000 | Buckley et al. ............. 359/839 |
| 6,124,647 A | | 9/2000 | Marcus et al. ............. 307/10.1 |
| 6,124,886 A | | 9/2000 | DeLine et al. .............. 348/148 |
| 6,139,172 A | | 10/2000 | Bos et al. .................... 362/494 |
| 6,158,655 A | | 12/2000 | DeVries, Jr. et al. ....... 235/380 |
| 6,172,613 B1 | | 1/2001 | DeLine et al. ............ 340/815.4 |
| 6,180,212 B1 | * | 1/2001 | Single et al. ................ 428/192 |
| 6,201,642 B1 | | 3/2001 | Bos ............................ 359/565 |
| 6,218,934 B1 | * | 4/2001 | Regan ......................... 340/438 |
| 6,318,870 B1 | * | 11/2001 | Spooner et al. ............. 359/872 |
| 6,329,925 B1 | * | 12/2001 | Skiver et al. ............ 340/815.4 |
| 6,428,172 B1 | * | 8/2002 | Hutzel et al. ............... 359/838 |
| 6,520,667 B1 | * | 2/2003 | Mousseau ................... 362/494 |
| 6,545,598 B1 | * | 4/2003 | de Villeroche .............. 340/438 |

OTHER PUBLICATIONS

U.S. Appl. No. 09/466,010, filed Dec. 17, 1999, entitled Interior Rearview Mirror Sound Processing System.

U.S. Appl. No. 09/396,179, filed Sep. 14, 1999, entitled Indicator for Vehicle Accessory.

U.S. Appl. No. 09/382,720, filed Aug. 25, 1999, entitled Accessory Module for Vehicle.

U.S. Appl. No. 09/433,467, filed Nov. 4, 1999, entitled Vehicle Interior Mirror Assembly.

U.S. Appl. No. 09/448,700, filed Nov. 24, 1999, entitled Rearview Mirror Assembly with Added Feature Modular Display.

U.S. Appl. No. 60/187,960, filed Mar. 9, 2000, entitled Complete Mirror Based Global Positioning System (GPS) Navigation Solution.

U.S. Appl. No. 09/533,127, filed Mar. 23, 2000, entitled Toggle Assembly for Rearview Mirror.

U.S. Appl. No. 09/199,907, filed Nov. 25, 1998, entitled Wide Angle Image Capture System for Vehicle.

U.S. Appl. No. 09/561,023, filed Apr. 28, 2000, entitled Vehicle-Based Navigation System with Smart Map Filtering, Portable Unit Home-Base Registration and Multiple Navigation System Preferential Use.

U.S. Appl. No. 60/186,520, filed Mar. 2, 2000, entitled Interior Rearview Mirror Assembly Incorporating a Video Screen.

U.S. Appl. No. 60/218,336, filed Jul. 14, 2000, entitled Interior Rearview Mirror assembly Incorporating a Video Screen (DON0t P-831).

* cited by examiner

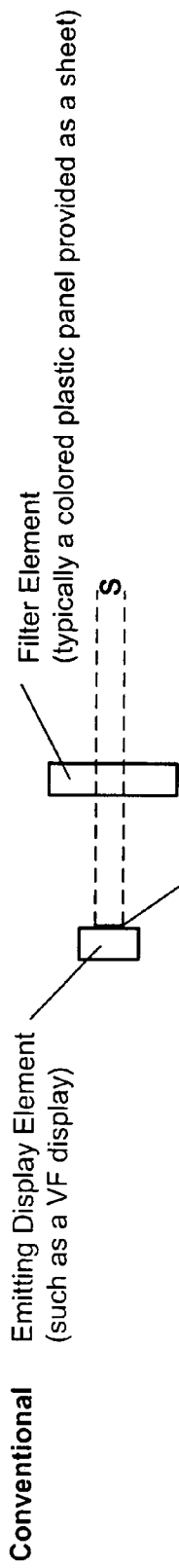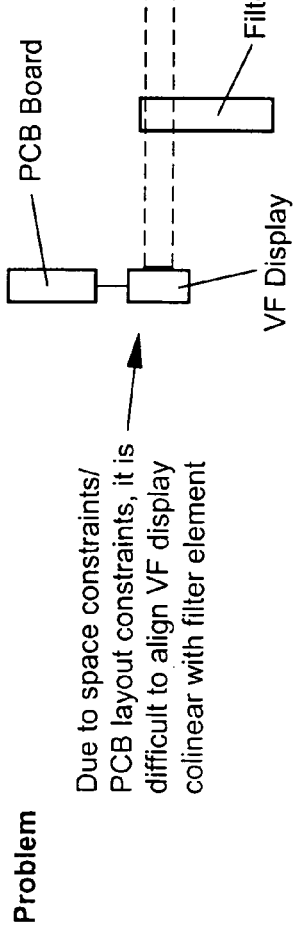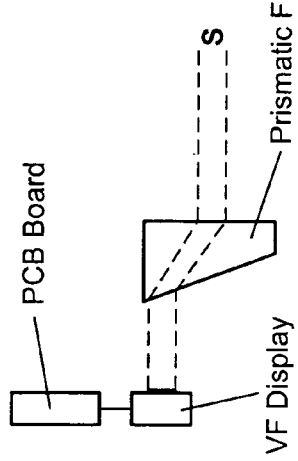

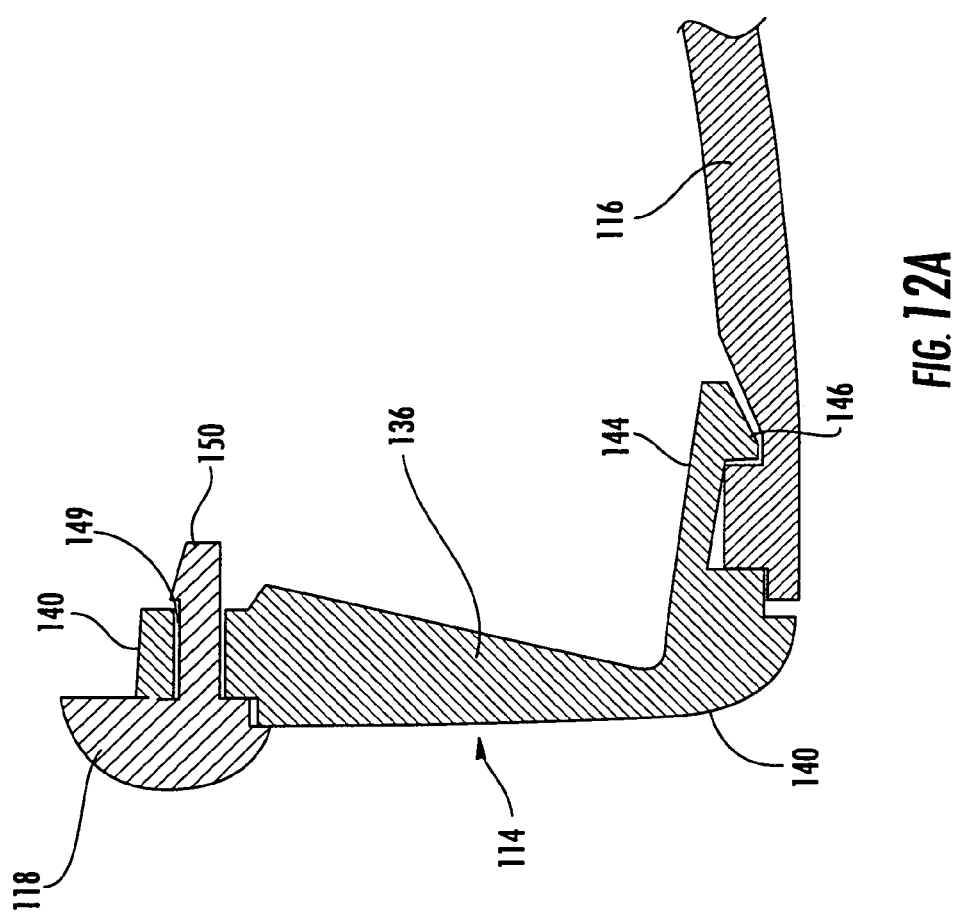

VEHICLE INTERIOR REARVIEW MIRROR ASSEMBLY WITH DISPLAY

This application is a continuation-in-part of U.S. patent application entitled VEHICLE INTERIOR REARVIEW MIRROR ASSEMBLY WITH DISPLAY, Ser. No. 09/663,036, filed Sep. 15, 2000, now U.S. Pat. No. 6,520,667, which is herein incorporated by reference in its entirety.

TECHNICAL FIELD AND BACKGROUND OF THE INVENTION

The present invention relates to rearview mirror assemblies and, more particularly, to vehicular rearview mirror systems incorporating information displays.

Recently, vehicle mirrors have incorporated a number of electronic and electrical devices, including information displays that provide information to the driver or occupants of the vehicle, such as compass headings or warnings relating to the status of the passenger airbag. In commonly assigned application Ser. No. 09/244,726, filed by Jonathon E. DeLine and Niall R. Lynam on Feb. 5, 1999, entitled REARVIEW MIRROR ASSEMBLY INCORPORATING VEHICLE INFORMATION DISPLAY, now U.S. Pat. No. 6,172,613, the disclosure of which is incorporated herein by reference in its entirety, information displays have been provided which include information relating to vehicle or engine status, warning information, such as information relating to oil pressure, levels of fuel, time, temperature, and the like. Furthermore, as described in commonly owned U.S. patent application Ser. No. 09/057,428, filed Apr. 8, 1998, now U.S. Pat. No. 6,158,655, which is incorporated in its entirety by reference herein, such displays can be used to engage in remote transactions.

With the ever-increasing number of devices desired to be housed in the mirror assembly and the increased number of functions provided by these various devices, making more efficient use of available space is highly desirable. In addition, because of the increase in the number of accessories or devices, the rearview mirror assembly process has become more difficult and complex. As a result, the alignment and positioning of these various devices or accessories is more of a challenge. This is especially true for displays.

For a display to produce a character which is visible to the driver, the display element must be properly aligned with the window or filter through which the character is viewed. However, quite often the components comprising a display may be supplied by different vendors and, as a result, may not align properly. In addition, given the proliferation of different mirror designs, vendors are forced to effectively custom manufacture their products to a given style of mirror, which ultimately increases the cost of the mirror assembly.

In the interest of the economy and ease of assembly, it is highly desirable to simplify the assembly process and provide mirror components that can accommodate a greater range of manufacturing or assembly tolerances and, further, accommodate different mirror assembly designs.

SUMMARY OF THE INVENTION

The present invention provides a rearview mirror system incorporating a carrier for user-actuatable interfaces, such as user-actuatable buttons or the like, that optionally provides a display screen for displaying one or more display characters. The carrier is mechanically mounted to the mirror case, for example by a snap-fit connection, including by a releasable mechanical connection thereby simplifying the assembly process.

In one form of the invention, a vehicle rearview mirror system includes a rearview mirror case having a reflective element and a carrier. The mirror system also includes at least one user-actuatable interface device positioned at the carrier. The mirror case is adapted to be mounted to a portion of the vehicle, with the carrier located at a viewing location of the mirror case whereby at least one of the driver and an occupant of the vehicle can interface with the user-actuatable interface device.

In one aspect, the carrier is mechanically connected to the case, for example, by a snap-fit connection. In another aspect, the carrier is releasably mechanically connected to the mirror case. In other aspects, the case includes a retaining rim with the carrier mechanically connected to the mirror case at the retaining rim. For example, the carrier may be mechanically connected to at least the retaining rim.

According to other aspects, the mirror system further includes a display element having at least one display character emitting a pattern of light to form a display image. The carrier provides a display screen, with the display element disposed behind the display screen. In addition, the display screen displays the display image at a viewing area for viewing by at least one of the driver and an occupant of the vehicle. In further aspects, the display screen includes a central viewing area generally aligned along a viewing axis. The display screen shifts the display image on the display element, which is offset from the viewing axis, to the central viewing area of the display screen. In a further aspect, the display screen shifts the display image by at least one of refraction and defraction.

According to another aspect, the reflective element comprises a prismatic reflective element and is pivotable between day and night reflective positions by a toggle assembly. In one form, the toggle assembly includes a grasping member, with the grasping member including a base and an outer surface. The base of the grasping member comprises a first material, with at least a portion of the outer surface comprising a second material having a lower hardness than the first material whereby the grasping member comprises a soft touch grasping member. For example, the second material may have a material hardness of less than approximately 70 Shore A Durometer. In addition, substantially the entire outer surface may be formed from the second material.

According to another form of the invention, a vehicle interior rearview mirror system includes a rearview mirror case having a reflective element, which is adapted to be mounted to an interior portion of the vehicle, a light emitting display element, and a display screen. The light emitting display element displays at least one display character emitting a pattern of light to form an image. The display screen is releasably mounted to the mirror case and includes a viewing area and, further, is adapted to display the image of the display character at the viewing area. The display screen is removable for at least one of replacement, repair, and upgrade.

In one aspect, the mirror system further includes at least one user actuatable interface device at the display screen. For example, the user actuatable interface device may comprise a user actuatable button. Furthermore, the user actuatable button may be backlit by a light source provided in the mirror case.

According to another aspect, the mirror system includes at least one light assembly which projects light through a lower portion of the mirror case. For example, the lower portion of the mirror case may include an opening, with the light assembly projecting light through the opening. In a further aspect, the light assembly includes a cover and a light source, with the cover positioned at the opening and the light source projecting light through the cover.

In yet another form of the invention, a prismatic interior rearview mirror system for a vehicle includes a mirror case having a reflective element, a support which is adapted to mount to an interior portion of a vehicle, and a toggle assembly. The mirror case is pivotably mounted to the support, with the toggle assembly adapted to pivot the mirror case and the reflective element about the support between a day position and a night position. The toggle assembly includes a grasping member having a base and an outer surface, at least the base comprising a first material having a first hardness, and at least a portion of the outer surface comprising a second material having a second hardness wherein the first hardness is greater than the second hardness.

In one aspect, the portion of the outer surface comprising a second material is molded onto the base. In a further aspect, the outer surface comprises the second material.

In another aspect, the mirror system further includes a carrier, which is mounted to the mirror case and includes at least one of a display screen and a user actuatable interface device for use by an occupant of the vehicle.

Advantages provided by this invention include a simplified assembly process, which will accommodate greater variations in the manufacturing or assembly processes of the various components, which are to be mounted within the mirror case. Additionally, the invention optionally provides a display that increases the visibility of the display characters of the display in the vehicle mirror system.

These and other objects, advantages, purposes, and features of the invention will become more apparent from the study of the following description taken in conjunction with the drawings.

BRIEF DESCRIPTION OF THE DRAWINGS

FIG. 7 is a schematic representation of a prior art arrangement of a display element, which is generally collinear with a display screen of a conventional mirror system illustrating the position of the display character as viewed by an occupant of the vehicle;

FIG. 8 is a schematic representation of a display element which is misaligned with the display screen and the position of display character as viewed by an occupant of the vehicle; and FIG. 9 is a schematic representation of a display element of the present invention and a display screen which shifts the display characters of the display element to a central viewing area of the display screen;

FIG. 12A is an enlarged partial cross-section view similar to FIG. 11A;

DESCRIPTION OF THE PREFERRED EMBODIMENTS

Figure 1:
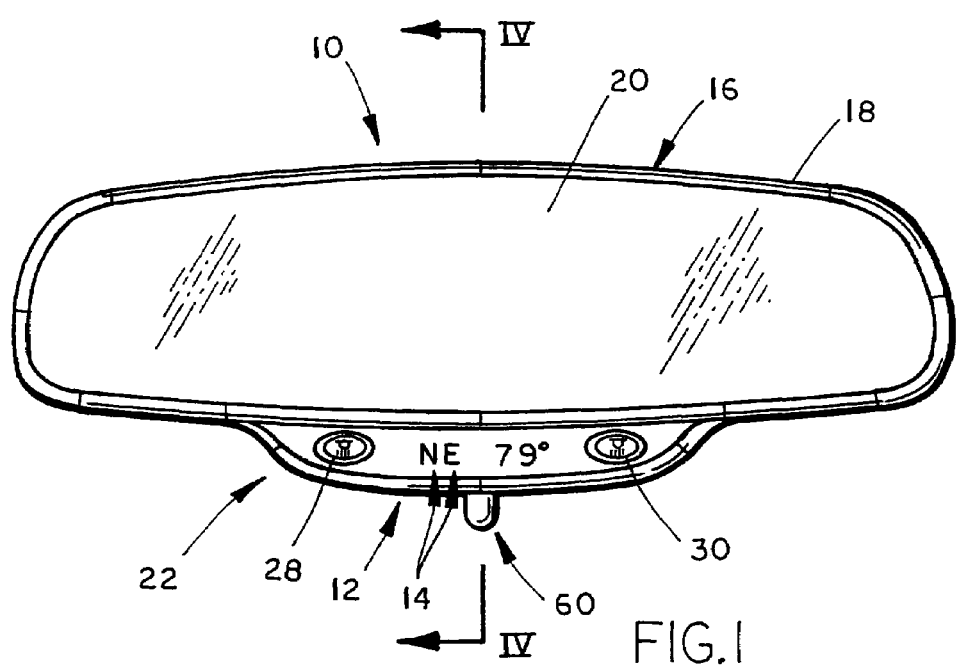
FIG. 1 is a front elevation view of a vehicle mirror system of the present invention.
Figure 2:
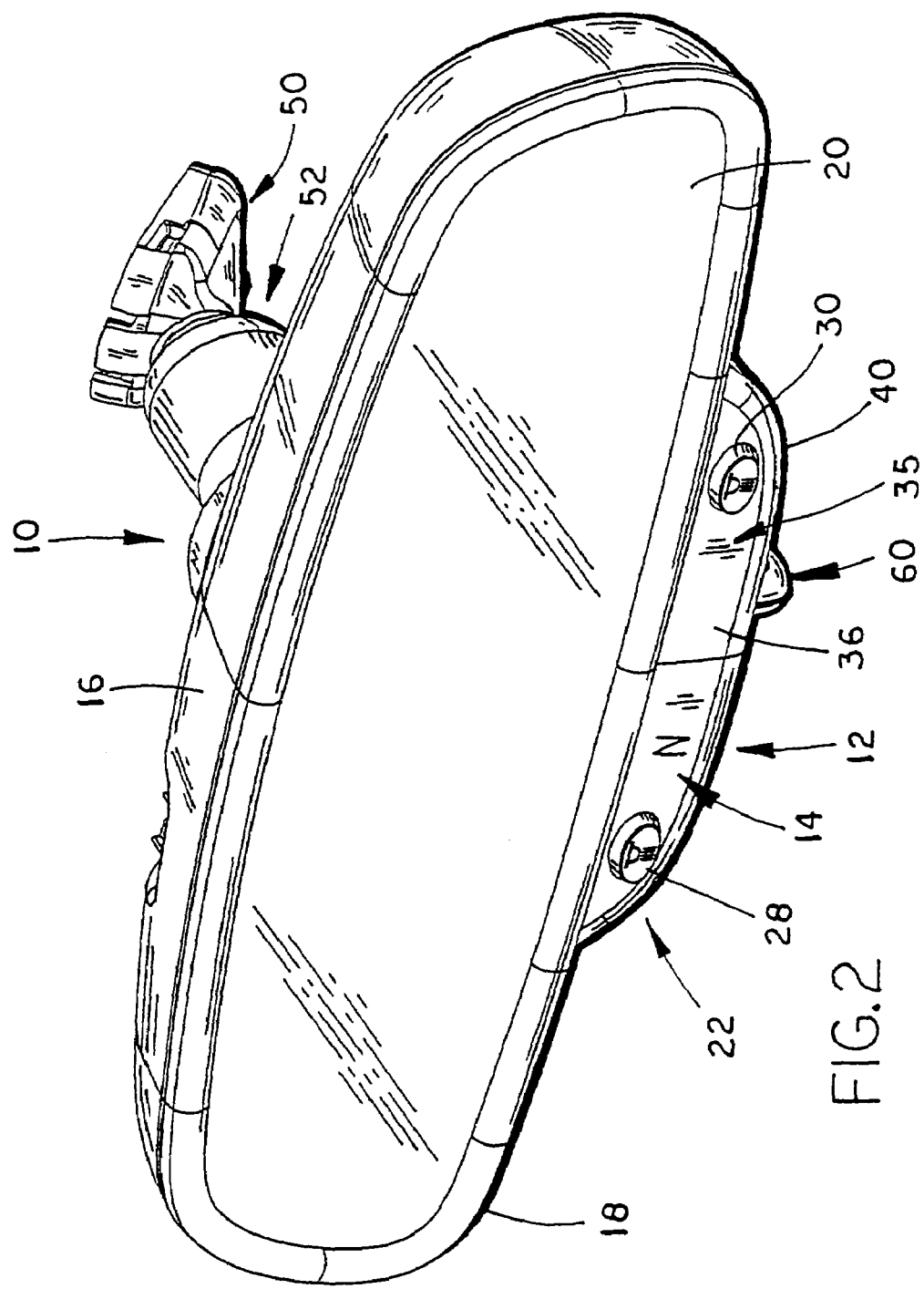
FIG. 2 is a perspective view of the vehicle mirror system of FIG. 1, which illustrates a display incorporated at a chin area of the mirror case of the mirror system.

Referring to FIG. 1, the numeral 10 generally designates a vehicle mirror system for vehicles of the present invention, which incorporates an improved display 12 for displaying one or more display characters 14, for viewing by the driver or occupant of the vehicle when the mirror system 10 is mounted to a vehicle, such as in the interior of the vehicle including, for example to a front windshield or headliner or header section of the vehicle.

Mirror system 10 includes a mirror case 16, with a retaining rim or bevel 18, and a mirror reflective element 20. Display 12 is preferably located at a peripheral portion of mirror case 16, such as at a lower peripheral portion in which display 12 forms an enlarged chin area 22. It should be understood, however, that display 12 may be provided in other locations, for example, at an upper peripheral portion such as to form an enlarged eyebrow area.

Optionally, display 12 includes one or more user actuatable interfaces, for example, user actuatable buttons or switches 28 and 30, which are mounted on a printed circuit board 32, as will be more fully described below, and which may provide a plurality of functions, including activating systems such as an ONSTAR system. Furthermore, switches or buttons 28, 30 may be used to activate or de-activate the display and/or toggle between displays or units of displays, such as between Fahrenheit and Celsius temperature readings. Optionally, buttons 28 and 30 may be back lit or otherwise illuminated by an illumination source, such as an LED or the like, which is provided, for example, on circuit board 32.

In addition, mirror system 10 may incorporate other utility functions, such as those described in U.S. Pat. No. 6,428,172, entitled REARVIEW MIRROR ASSEMBLY WITH UTILITY FUNCTIONS, filed Nov. 24, 1999, by Barry W. Hutzel, Niall R. Lynam, and Darryl P. DeWind, which is herein incorporated by reference herein in its entirety. Alternatively or in addition, mirror system 10 may incorporate a microphone or a plurality of microphones preferably to provide hands-free input to a wireless telecommunication system such as the ONSTAR™ system in use in General Motors vehicles. Most preferably such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein. Microphones, sound processing systems, and other accessories suitable to use in the mirror systems of the present invention are disclosed in co-assigned U.S. patent application Ser. No. 09/466,010 filed Dec. 17, 1999, now U.S. Pat. No. 6,420,975; Ser. No. 09/396,179 filed Sep. 14, 1999, now U.S. Pat. No. 6,278,377; Ser. No. 09/382,720 filed Aug. 25, 1999, now U.S. Pat. No. 6,243,003; Ser. No. 09/449,121 filed Nov. 24, 1999, now U.S. Pat. No. 6,428,172; Ser. No. 09/433,467 filed Nov. 4, 1999, now U.S. Pat. No. 6,326,613; and Ser. No. 09/448,700 filed Nov. 24, 1999, now U.S. Pat. No. 6,329,925, the entire disclosures of all of which are hereby incorporated by reference herein.

Figure 3:
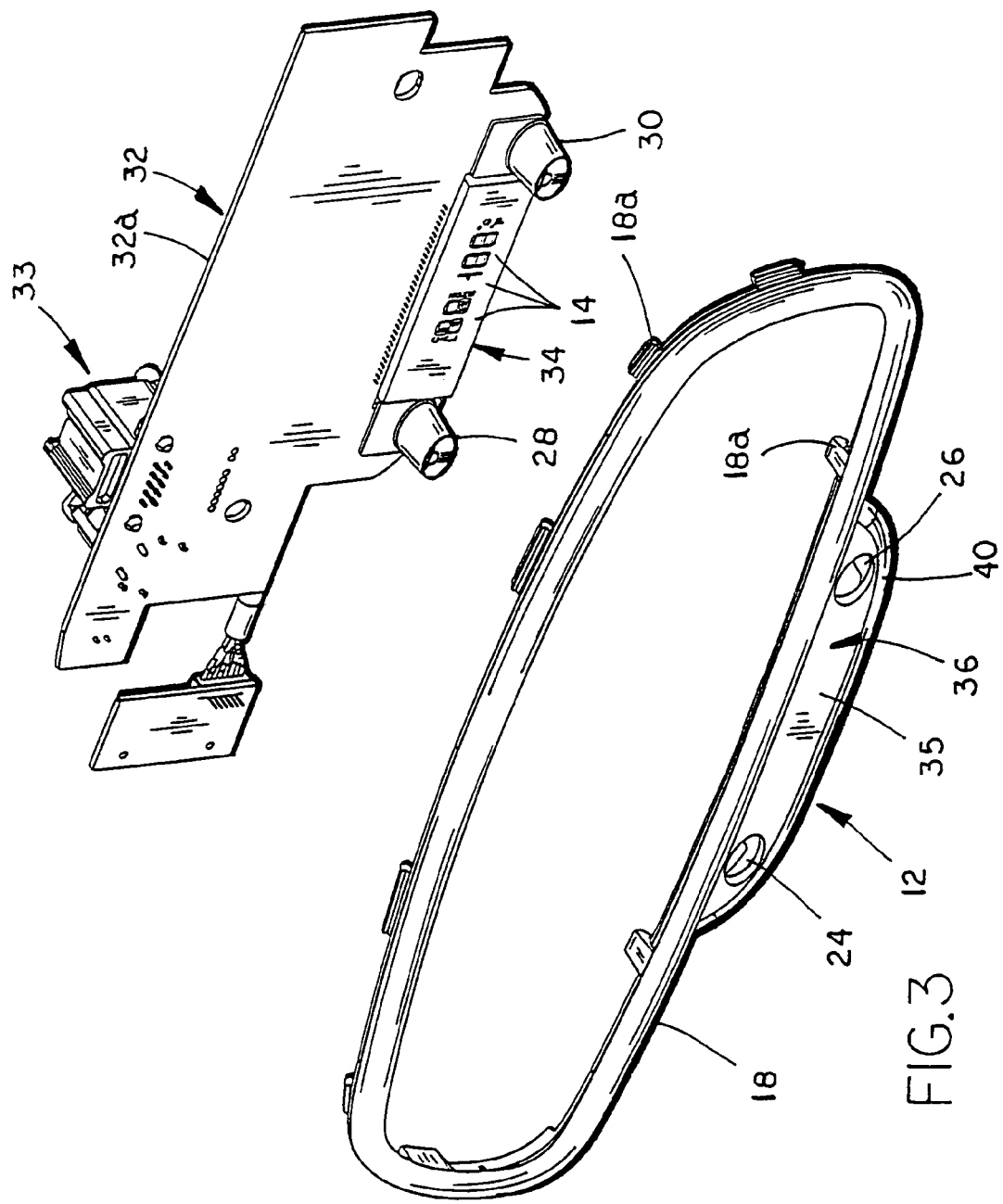
FIG. 3 is an exploded perspective view of a retaining rim, a display element, and a circuit board of the mirror system of FIG. 1.

Referring to FIG. 3, positioned in casing 16 is circuit board 32. Circuit board 32 includes a display element 34 and, further, preferably supports and powers user actuatable buttons 28 and 30. Preferably, display element 34 comprises a light emitting display, such as a vacuum fluorescent display, a light emitting diode display, a field emission display, an electro-illuminescent display or the like. Display element 34 includes one or more display characters 14, which provide information by way of indicia, such as alphanumeric indicia or symbolic or graphical indicia, including such as icons, and may include passenger safety information, such as passenger side inflatable restraint (PSIR) status or supplemental inflatable restraint (SIR) status. Display element 34 preferably includes alphanumeric indicia and optionally may include multiple pixel, reconfigurable, addressable, displays or optionally may include a scrolling display. Display characters 14 may also include information relating to compass headings vehicle status, environment, such as temperature, time, or the like.

Characters 14 are viewed on a display screen 36, which is supported at lower perimeter of retaining rim 18. Display screen 36 preferably is formed from a plastic material, such as acrylic or polycarbonate, but may optionally, comprise a glass element. The display element is typically obtained from a display element manufacture, which provides the display element with fixed length leads. In addition, it is desired that these display elements are mounted to the circuit board by the manufacture of the circuit board, which is then shipped to the mirror assembly location. In this manner, the circuit board is pre-assembled with the display element, which reduces the mirror assembly processing time. To accommodate the variations in location of these display elements on pre-assembled circuit boards, the present invention provides a means to shift the image emitted by the display characters on the display element so that they properly align with the display screen on the mirror assembly housing. As will be more fully described below, display screen 36 is adapted to shift the image of display characters 14 so that they can be viewed through a central viewing area 35 of screen 36 even though display element 34 is not aligned with the central viewing area 35.

Preferably, display element 34 is soldered to printed circuit board 32, which is positioned within mirror case 16. Alternatively, display element 34 may be removably mounted to circuit board 32. Circuit board 32 may support other devices, such as a compass sensor circuit or one or more light assemblies, such as map lights, or the like, so that devices to be placed in mirror case 16 can be pre-assembled on circuit board 32 prior to placement in the case which substantially improves the manufacturing process of mirror system 10. For example, circuit board 32 may include electronic and electric devices, including a blind spot detection system, such as the type disclosed in U.S. patent application Ser. No. 08/799,734 entitled VEHICLE BLIND SPOT DETECTION AND DISPLAY SYSTEM, invented by Schofield et al., and filed Feb. 12, 1997, now U.S. Pat. No. 5,786,772, or rain sensor systems, for example rain sensor systems which include windshield contacting rain sensors, such as described in U.S. Pat. No. 4,973,844 entitled VEHICULAR MOISTURE SENSOR AND MOUNTING APPARATUS THEREFORE, or non-windshield contacting rain sensors, such as described in PCT international Application PCT/US94/05093 entitled MULTI-FUNCTION LIGHT SENSOR FOR VEHICLE, published as WO 94/27262 on Nov. 24, 1994, the disclosures of which are hereby incorporated by reference herein in their entireties. Also, circuit board 32 may include circuitry for mirror mounted video cameras, which are used to visually detect the presence of moisture on the windshield and actuate windshield wipers accordingly, such as described in U.S. application Ser. No. 08/621,863, filed Mar. 25, 1996, entitled VEHICLE HEADLIGHT CONTROL USING IMAGING SENSOR, by Schofield et al., now U.S. Pat. No. 5,796,094, or mirror mounted cameras for vehicle internal cabin monitoring disclosed in U.S. Pat. Nos. 5,877,897 and 5,760,962, both commonly assigned to Donnelly Corporation, which are hereby incorporated herein by reference in their entireties. Other electronic or electrical devices mounted to circuit board 32 may include for example home access transmitters, a high/low or daylight running beam low headlight controller, a hands free cellular phone attachment, a video device, such as a video camera for internal cabin surveillance and/or video telephone function, remote keyless entry receiver, a compass, a seat occupancy detector, a trip computer, an intrusion detector, and the like. As used in the specification, an electrical device encompasses an electrically operated accessory or device such as a map light or the like. An electronic device encompasses an electronic circuit board or PCB (such as an automatic light dimming circuit board, a compass sensing and directional circuit board or the like) or electron devices or circuits or systems, including electron tubes, microprocessors, amplifiers, transistors, and other devices that do the work of electron tubes. In addition, by placing or mounting the devices on a common printed circuit board, the use of common parts is facilitated and, therefore, the number of parts can be reduced in the assembly process, which ultimately reduces costs as well as improves the assembly process.

In order to connect the various electrical or electronic devices in case 16 to the vehicle electrical system and optionally to on-board computers, circuit board 32 includes a connector 33, such as a 16-pin connector, mounted to rear surface 32a (FIG. 3). When mirror assembly 10 is fully assembled, connector 33 aligns with an access opening (not shown) provided on back wall 16c of case 16 (FIGS. 4, 4A and 4B) through which connector 33 is then connected to the vehicle electrical system and optional on board computer by way of a plug connector and cable.

Figure 4:
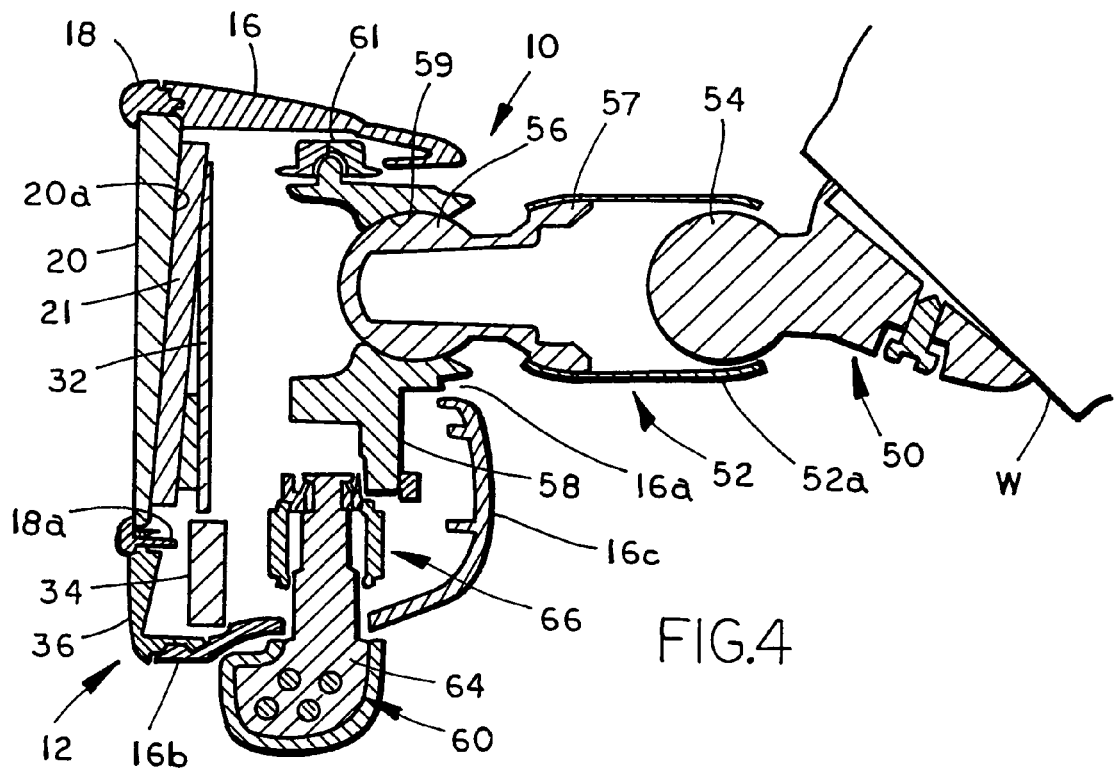
FIG. 4 is a cross-section view taken along line IV—IV of FIG. 1.

As best seen in FIG. 4, circuit board 32 is mounted in casing 16 behind reflective element 20, with display element 34 shifted up from display screen 36. In preferred form, display screen 36 shifts or directs light from display element 34 by refraction so that the display characters on display element 34 can be viewed through central viewing area 35 of display screen 36 so that the driver or occupant of the vehicle can view the information. As previously described, display 12 provides information to a driver or occupant of the vehicle and may display information, such as vehicle status, or information relating to an accessory of the vehicle. For example, display 12 may include information relating to a global positioning system (GPS), temperature, tire pressure indicator, fuel levels, a compass system, or the like, with mirror system 10 optionally incorporating the mirror based global positioning system, such as the type disclosed in commonly assigned, co-pending U.S. provisional Pat. application Ser. No. 60/187,960, filed Mar. 9, 2000, by McCarthy et al., for COMPLETE MIRROR BASED GLOBAL POSITIONING SYSTEM (GPS) NAVIGATION SOLUTION, the disclosure of which is herein incorporated by reference in its entirety.

Figure 4A:
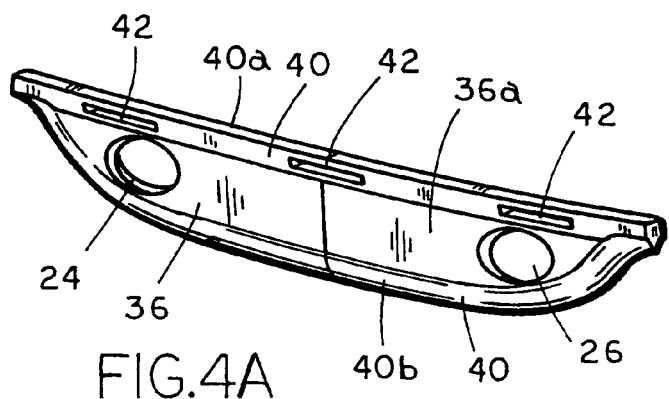
FIG. 4A is a front perspective view of the display screen of the present invention.
Figure 4B:
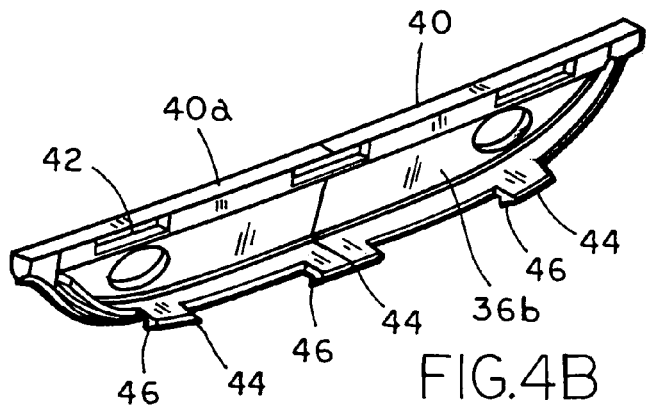
FIG. 4B is a rear perspective view of the display screen of FIG. 4A.

Referring to FIG. 4A, display 12 includes a central portion which forms display screen 36 and a perimeter portion 40 which provides a mounting flange for mounting display screen 36 to casing 16. As best seen in FIG. 4A, upper portion 40a of perimeter portion 40 includes a plurality of elongate openings 42. Referring to FIG. 4, retaining rim 18 includes a plurality of mounting flanges 18a which extend through openings 42 and also into corresponding receiving structures formed on case 16. Flanges 18 are preferably heat staked, for example, in openings 42 to secure display screen 36 to retaining rim 18. Lower portion 40b of perimeter portion 40 includes a plurality of inwardly projecting flanges 44 with cam surfaces 46 to provide a snap fit arrangement of display screen 36 onto casing wall 16b, as seen in FIG. 4. As previously noted, in preferred form, display screen 36 is formed from a plastic material, such as acrylic or polycarbonate, or may be formed from a glass element, and is more preferably formed from a colored or tinted material to provide a filter so that when character displays 14 are not illuminated, the front surface 36a of screen 36 appears to be a solid or opaque color. Alternately, screen 36 may include a film applied thereto to form a filter. In addition, screen 36 preferably includes a pair of openings 24, 26 through which user actuated buttons 28 and 30 extend when circuit board 32 is mounted in casing 16.

Figure 5:
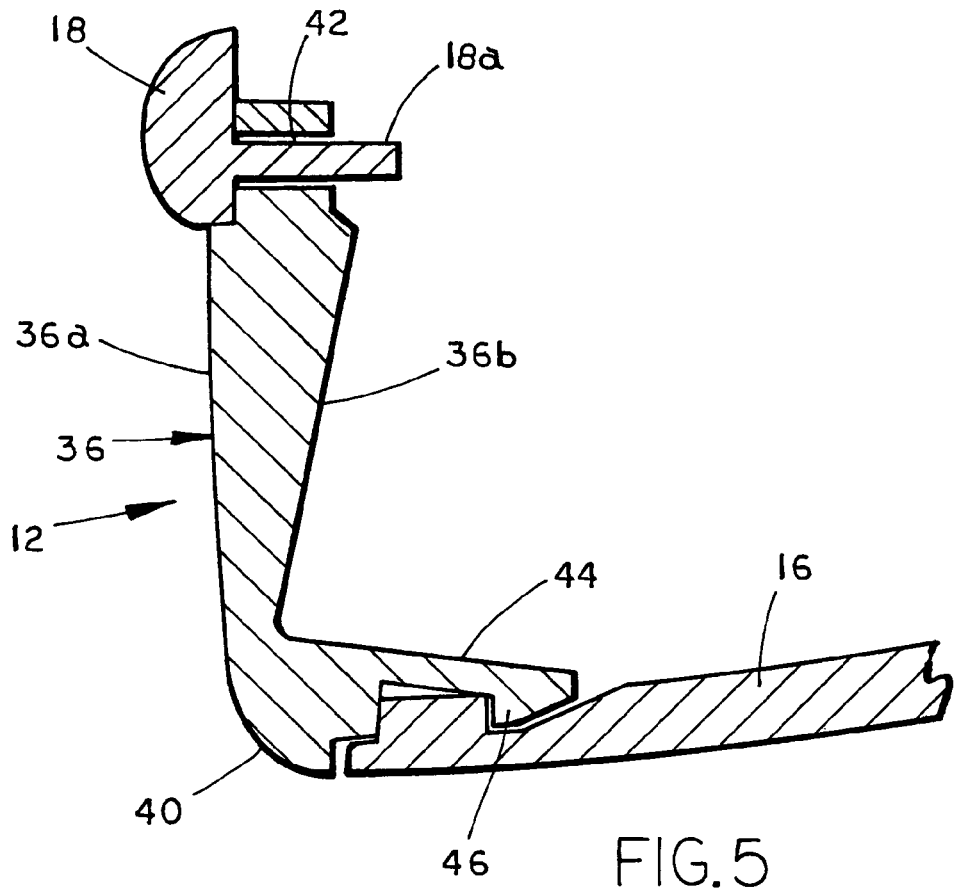
FIG. 5 is an enlarged view of the display screen shown mounted to the mirror case.
Figure 6:
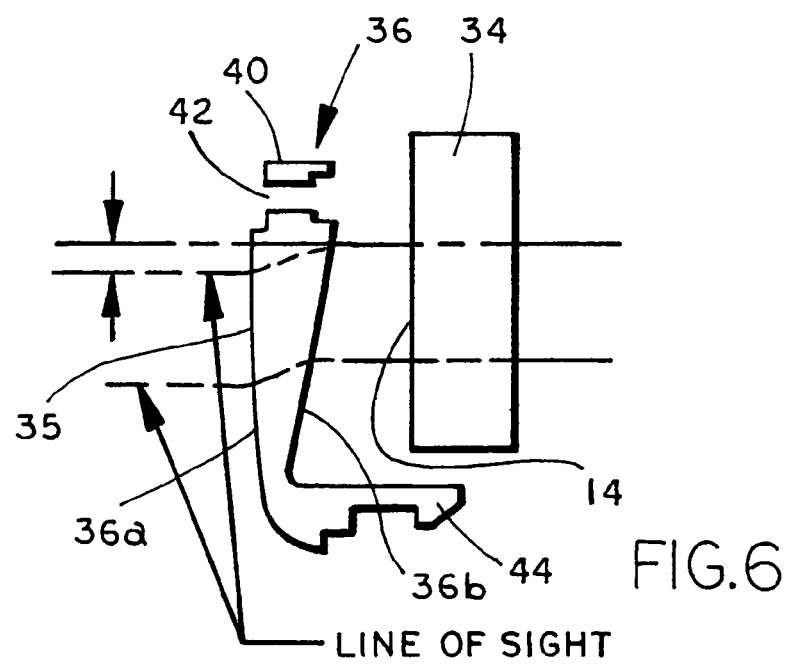
FIG. 6 is an enlarged view similar to FIG. 5 illustrating the display element relative to the display screen of FIG. 5.

As best seen in FIG. 5, display screen 36 includes an inner surface 36b which is angled with respect to outer surface 36a of screen 36 to form a refractive element. For example, the angle may be varied and depends on the material properties and, further, on the degree of shifting that is desired. For example, in the illustrated embodiment, the angle is approximately 15°. Preferably, display screen 36 is formed from a material, such as a polymeric material, having a refractive index in a range of about 1.3 to 1.8 and, more preferably, in a range of about 1.4 to 1.7, and, most preferably, in a range of about 1.45 to 1.65. As a result, screen 36 redirects light from display element 34 so that the image of the display characters 14 is shifted to generally appear in the central viewing area region 35 of screen 36. As best seen in FIGS. 6 and 8, the light rays forming the image of the display characters that are emitted by display element 34 are bent downwardly when they enter screen 36 through inner surface 36b and then are redirected in a generally parallel direction with the incoming rays from display element 34 when the light rays exit through outer surface 36a. In this manner, display screen 36 shifts the image of the characters displayed on display element 34 downwardly (in this application) to the central viewing area 35 of display screen 36 by refraction. As a result, even though display element 34 is not aligned along the viewing axis of central viewing area 35, the display characters of display element 34 appear to be generally aligned along the central axis of viewing area 35 of screen 36 so as to be visible by the driver or occupants of the vehicle.

The luminous intensity of display characters 14 should be of sufficient intensity so as to be readily visible by an occupant of the vehicle even under high ambient lighting conditions such as during daylight driving. Optionally, the intensity of the display characters may be reduced during night time driving to a lower luminous light intensity, for example by using a signal, typically a pulse with modulated signal, from the vehicle that causes the screen 36 to dim in tandem with the lights and the instrument panel. Another option is to use mirror mounted photo sensor or sensors that cause the screen 36 to dim when low ambient conditions are detected, such as described in U.S. Pat. Nos. 5,146,313 and 5,285,060, the disclosures of which are incorporated in their entirety by reference herein.

Alternately, screen 36 may include parallel inner and outer surfaces, with the inner surface etched with a diffractive surface, in which case screen 36 bends the image using diffraction. In addition, screen 36 can bend the image using a combination of diffraction and refraction. Reference is made to U.S. Pat. No. 5,538,674, entitled METHOD FOR REPRODUCING HOLOGRAMS, KINOFORMS, DIFFRACTIVE OPTIC ELEMENTS AND MICROSTRUCTURES, which is commonly assigned to Donnelly Corporation of Holland, Mich., for a suitable method of forming the diffractive properties, which is herein incorporated by reference herein in its entirety. In addition, screen 36 may be molded with diffractive bodies suspended in the screen body to form the diffractive properties.

In contrast to conventional display screens illustrated in FIGS. 6 and 7, display screen 36 of the present invention bends the light emitted from the display element to correct for the non-colinearity of the display element with respect to the display screen. Conventional display screens, on the other hand, display the characters at the same general elevation of the display character illuminated on the display element; thus, when the display element is positioned offset from the central area of the display screen, the character displayed will appear off-center and often be blocked by the bezel portion of the mirror assembly. In contrast, as previously described, the present invention shifts the image such that the displayed image appears to be generally centered in the central viewing area of the filter element.

In the illustrated embodiment, reflective element 20 comprises a prismatic element; however, it can be appreciated that reflective element 20 may comprise an electrochromic reflective element, with the electrochromic circuitry provided on circuit board 32. Suitable electrochromic elements are described in commonly assigned U.S. Pat. Nos. 5,140,455 and 5,151,816 or a solid state electrochromic medium such as described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Grandquist, Eds., Optical Engineering Press, Washington (1990), the disclosures of which are hereby incorporated by reference herein in their entireties. Other suitable electrochromic reflectors are described in U.S. Pat. Nos. 5,567,360; 5,525,264; 5,610,756; 5,406,414; 5,253,109; 5,076,673; 5,073,012 or 5,117, 346, which are all commonly assigned to Donnelly Corporation, the disclosures of which are herein incorporated by reference in their entireties.

In preferred form, reflective element 20 is retained in a rear facing opening of case 16 by retaining rim 18. Retaining rim 18 and casing 16 are both preferably formed from a resinous polymeric material or plastic and, more preferably, a melt processible plastic and, most preferably, an engineered polymer, for example an ABS plastic. Retaining bezel 18 extends around and over the perimeter portion of reflective element 20 and engages a plurality of structures provided at the perimeter portion of case 16 to thereby support and retain reflective element 20 in case.

Mounted to rear surface 20a of reflective element 20 is one or more foam or resilient pads 21, which provide additional support for the reflective element 20 when retaining rim 18 is mounted to case 16. Pads 21 act as shock absorbers to reduce the vibration in reflective element 20 and further reduce the risk of breaking the glass forming reflective element 20 during impact. For example, pads 21 may comprise cross-linked polyethylene foam.

As previously noted, mirror system 10 may be mounted to an interior of a vehicle, and in the illustrated embodiment, is configured for mounting to a windshield W of the vehicle on a break-away mount 50. Case 16 is mounted to break-away mount 50 by support 52, which preferably permits multi-axis positioning of casing 16 about support 52. As illustrated, support 52 preferably comprises a dual ball mount arrangement, which includes a tubular member 52a that receives a ball mount 54 from break-away mount 50 and supports a second ball mount 56 for engaging case 16. Ball mount 56 couples to a bracket assembly 58 and is received through opening 16a in back wall 16c of case 16 in socket 59 of bracket assembly 58. Ball mounts 54 and 56 are preferably zinc ball studs, which are respectively insert molded into break-away mount 50 and base 57. Break-away mount 50 includes a body preferably formed from a resinous polymeric or plastic material and, more preferably, from a mineral filled polypropylene, such as glass or mineral filled nylon, for example RENY252A.

In the illustrated embodiment, bracket assembly 58 forms part of the pivot structure for mirror system 10 and is pivotally mounted to a frame 61, which is mounted to case 16 and is actuated to pivot about frame 61 to thereby pivot case 16 about support 52 by a toggle assembly 60. Reflective element 20 is adjusted between its day time viewing position and its night time viewing position by toggle assembly 60 when toggle assembly 60 pivots casing 16 about ball mount 56. Preferably toggle assembly 60 includes a knob 64 and a cam 66, which is pivotally positioned within bracket assembly 58, such that rotation of knob 64 causes pivoting of mirror case 16, including bezel 18 and reflective element 20, relative to support 52 such as disclosed in commonly assigned U.S. patent application Ser. No. 09/448,700, filed Nov. 24, 1999, by Skiever et al., entitled REARVIEW MIRROR ASSEMBLY WITH ADDED FEATURE MODULAR DISPLAY, now U.S. patent Ser. No. 09/448,700, the disclosure of which is hereby incorporated in its entirety by reference herein. Alternately, toggle assembly 60 may comprise the type disclosed in commonly assigned U.S. patent application Ser. No. 09/533,127, filed Mar. 23, 2000, by Ralph A. Spooner and Jerry L. Beck, entitled TOGGLE ASSEMBLY FOR REARVIEW MIRROR, now U.S. Pat. No. 6,318,870, the disclosure of which is hereby incorporated by reference in its entirety.

Other suitable mounting brackets or mounting arrangements are also disclosed in U.S. Pat. Nos. 5,487,522; 5,671, 996; 5,820,097; 5,615,857; 5,330,149; 5,100,105; 4,930, 742; or 4,936,530 or U.S. patent application Ser. No. 08/781, 408, filed Jan. 10, 1997, now U.S. Pat. No. 5,820,097, all commonly assigned to Donnelly Corporation, the entire disclosures of which are hereby incorporated herein by reference.

Mirror system 10 may also incorporate a plurality of other features, including, for example map lights, such as disclosed in commonly assigned U.S. Pat. Nos. 5,669,698; 5,820,245; 5,671,996; 5,813,745; 5,178,448; 4,733,336; and 4,646,210, the disclosures of all of which are herein incorporated by reference in their entireties. In addition, mirror system 10 may incorporate a microphone module, such as described in commonly assigned application Ser. No. 09/382,720, entitled ACCESSORY MODULE FOR VEHICLE filed by Jonathan E. Deline and Niall R, Lynam on Aug. 25, 1999, now U.S. Pat. No. 6,243,003 the disclosure of which is herein incorporated by reference in its entirety. Such microphone modules may be used, for example to provide a hands-free input to wireless communication systems such as an ONSTAR system used in General Motors vehicles. In addition or alternatively, such microphones provide input to an audio system that transmits and communicates wirelessly with a remote transceiver, preferably in a voice recognition mode. Such systems are described in U.S. patent application Ser. No. 09/382,720, filed Aug. 25, 1999, now U.S. Pat. No. 6,243,003, the disclosure of which is herein incorporated by reference in its entirety. In this manner, desirably all the electronics and electrical devices, with the exception of, for example a microphone module, may be supported, formed and/or housed on circuit board 32. Thus, the mirror assembly can be quickly and readily assembled with circuit board 32 which forms a carrier member or cartridge or modular unit/assembly which can be quickly inserted into the cavity of casing 16.

In addition, display 12 may include a display of the speed limit applicable to the location of where the vehicle is traveling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, such as display screen 36, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle or wired together. Thus, for example, an interior electrochromic mirror and an exterior electrochromic mirror is connected by at least one wire in order to transmit control signal and the like. With BLUETOOTH and similar systems, control commands can be broadcast between the interior mirror and the exterior mirror (and vice versa) without the need for physical wiring interconnecting the two. Likewise, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio-local network such as BLUETOOTH. Similarly, tire pressure sensors in the wheels can transmit via BLUETOOTH to a receiver in the interior mirror assembly, and tire pressure status can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/ interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly or the exterior side view mirror assembly). Also, the interior rearview mirror and/or the exterior side view mirrors can function as transceivers/display locations/ interface locations for intelligent vehicle highway systems, using protocols such as the BLUETOOTH protocol. Protocols such as BLUETOOTH, as known in the telecommunications art, can facilitate voice/data, voice over data, digital, and analogue communication and vehicle/external wireless connectivity, preferably using the interior and/or exterior mirror assemblies as transceiver/display/user-interaction sites. Electronic accessories to achieve the above can be accommodated in casing 16, and/or elsewhere in the interior rearview mirror assembly (such as in the housing disclosed in U.S. patent application Ser. No. 09/433,467 filed Nov. 4, 1999 entitled VEHICLE INTERIOR MIRROR ASSEMBLY to Patrick Heslin and Niall R. Lynam, now U.S. Pat. No. 6,326,613.

As described, the rearview mirror assembly of the present invention can include a wide variety of electrical and electronic devices incorporated therein and, further, may incorporate utility functions, such as described in U.S. Pat. No. 6,428,172, entitled REARVIEW MIRROR ASSEMBLY WITH UTILITY FUNCTIONS, filed Nov. 24, 1999, by Barry W. Hutzel, Niall R. Lynam, and Darryl P. DeWind, which is herein incorporated by reference herein in its entirety. For example, rearview mirror assemblies may include: Antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530, 240 or in U.S. pending application Ser. No. 09/244,726, filed Feb. 5, 1999; blind spot detection systems, such as disclosed in U.S. Pat. No. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and application Ser. No. 09/433, 467, now U.S. Pat. No. 6,326,613; a remote keyless entry receiver; map lights, such as disclosed in U.S. Pat. Nos. 5,938,321, 5,813,745, 5,820,245, 5,673,994, 5,649,756, or 5,178,448; microphones and/or speakers, such as disclosed in U.S. patent applications Ser. No. 09/361,814, filed Jul. 27, 1999, now U.S. Pat. No. 6,201,642, and Ser. No. 09/199, 907, filed Nov. 25, 1998; a compass, such as disclosed in U.S. Pat. No. 5,924,212; seat occupancy detector; a trip computer; an ONSTAR System or the like, with all of the referenced patents and applications being commonly assigned to Donnelly Corporation, the disclosures of which are herein incorporated by reference in their entireties. Other features which can be incorporated include: A baby minder system, such as the vehicle interior monitoring system described in U.S. Pat. Nos. 5,877,897 and 5,760,962 or the rear vision system described in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610, and U.S. patent application Ser. No. 09/433,467, filed Nov. 4, 1999, entitled VEHICLE INTERIOR MIRROR ASSEMBLY to Patrick Heslin and Niall R. Lynam, now U.S. Pat. No. 6,326,613, all of which are incorporated by reference in their entireties herein.

For example, in the case of an interior rearview mirror assembly, a camera, such as a CMOS or CCD camera, can be mounted in mirror system 10 to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources, and the like, and most preferably such non-incandescent sources are low power and are directed low intensity sources, such as described in U.S. Pat. No. 5,938,321, and U.S. patent application entitled INTERIOR MIRROR ASSEMBLY FOR A VEHICLE INCORPORATING A SOLID-STATE LIGHT SOURCE, Ser. No. 09/287,926, filed Apr. 7, 1999, now U.S. Pat. No. 6,139,172, which are incorporated herein by reference in their entireties. A baby minder camera may be mounted as a part of the rearview mirror assembly and, most preferably, may be mounted as a part of a header, including a front header of a roof or a rear header of a roof. It may be desirable to mount a baby minder camera to the rear header of a roof when it is desirable to view rear facing child support seats. Most preferably, a plurality of at least two, more preferably at least four, and most preferably at least six LEDs are mounted with a camera (such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, non-incandescent camera illumination sources can be illuminated whenever the ignition switch is on to operate the vehicle or at least when the ignition switch is placed in "an accessory on" position so that both the camera and illumination lights are operating on vehicle battery power even when parked. Alternately, the illumination lights can be operational only when the baby minder camera is selected to be operational. While it is preferred to use non-incandescent lights, such incandescent light sources can be used and more preferably high intensity, low current incandescent light sources. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible. For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. Furthermore, the mirror assemblies of the present invention may incorporate a navigation system, such as described in co-pending provisional application Ser. No. 60/131,593, filed Apr. 29, 1999, entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, which is herein incorporated by reference in its entirety. Alternately or in addition, the modular aspects of the present invention can be combined with or incorporate a wide variety of other interior rearview mirror assemblies including electrically operated compass mirrors such as disclosed in U.S. Pat. No. 5,253,109; electrically operated interior rearview mirrors incorporating map reading lights such as disclosed in U.S. Pat. Nos. 4,646,210, 4,733,336, 4,807,096, and 5,178,448; and electrically operated automatically dimming mirrors such as described in U.S. Pat. Nos. 4,793,690, 4,799,768, 4,886,960, and 5,193,029; mirror assemblies incorporating GPS such as disclosed in U.S. patent application Ser. No. 08/569,851, filed Dec. 8, 1995, by Roger L. Veldman and Desmond O'Farrell entitled A VEHICLE GLOBAL POSITIONING SYSTEM NAVIGATIONAL AID, now U.S. Pat. No. 5,971,552; mirrors including head light controls, such as disclosed in U.S. patent application Ser. No. 08/621,863, filed Mar. 25, 1996, entitled VEHICLE HEADLIGHT CONTROL USING IMAGING SENSOR, now U.S. Pat. No. 5,796,094; mirrors incorporating displays, such as disclosed in U.S. patent application Ser. No. 09/244,726, filed Feb. 5, 1999, entitled REARVIEW MIRROR ASSEMBLY INCORPORATING VEHICLE INFORMATION DISPLAY, now U.S. Pat. No. 6,172,613, and U.S. Pat. No. 5,530,240, entitled DISPLAY FOR AUTOMATIC REARVIEW MIRROR; mirrors incorporating blind spot detection systems, such as disclosed in U.S. Pat. No. 5,530,240, U.S. Pat. No. 5,576,687, and U.S. patent application Ser. No. 08/799,734 entitled VEHICLE BLIND SPOT DETECTION AND DISPLAY SYSTEM, filed Feb. 12, 1997, now U.S. Pat. No. 5,786,772; and mirrors incorporating remote transaction systems, such as disclosed in U.S. patent application Ser. No. 09/057,428, filed Apr. 8, 1998, entitled A VEHICLE MOUNTED REMOTE TRANSACTION INTERFACE SYSTEM, now U.S. Pat. No. 6,158,655, and U.S. Pat. No. 5,798,575, all commonly assigned to Donnelly Corporation, Holland Mich., the disclosures of which are herein incorporated by reference in their entireties.

Figure 10:
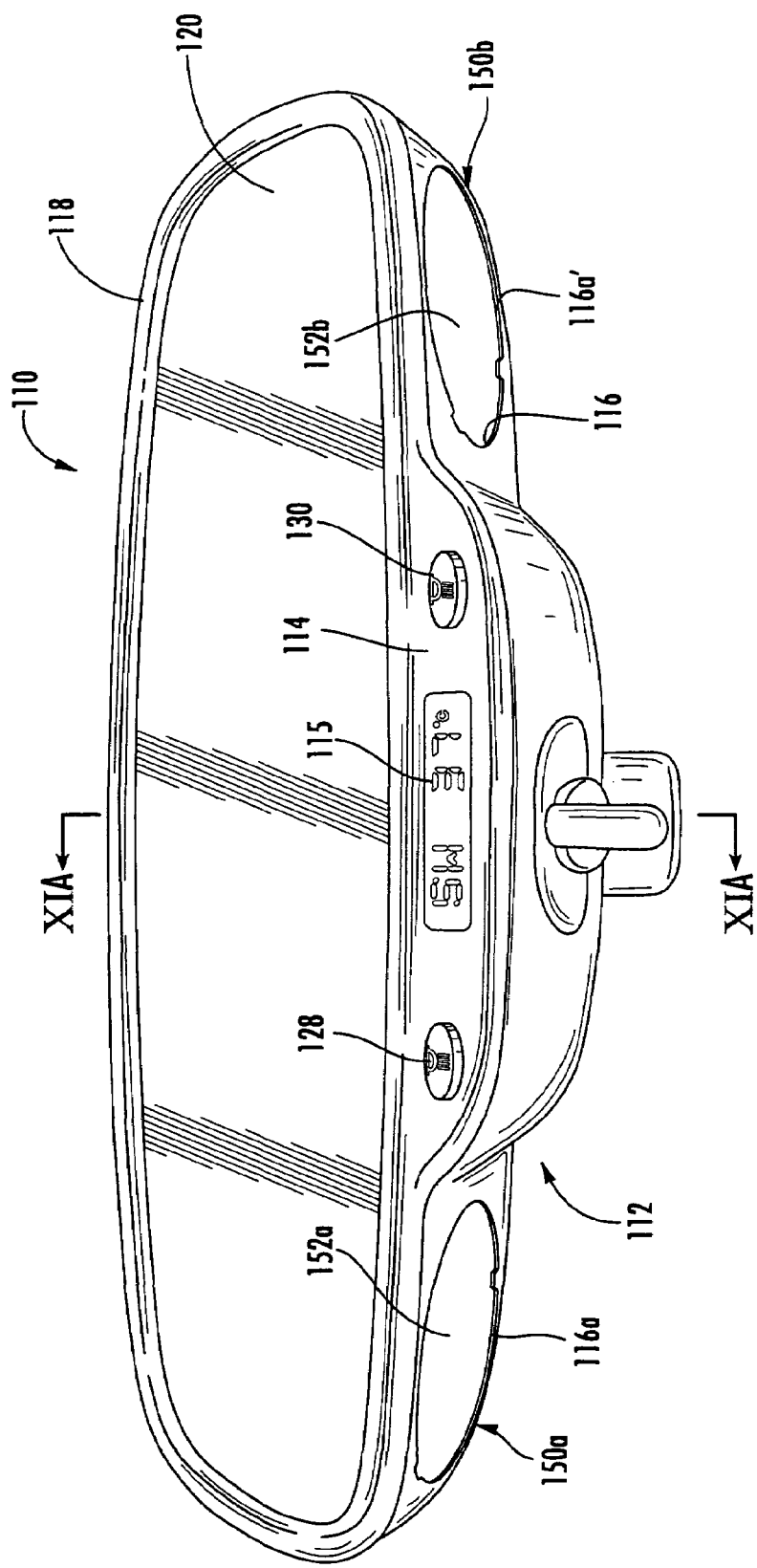
FIG. 10 is a front bottom perspective of another embodiment of a vehicle mirror system of the present invention.

In addition, reflective element 20 may include one or more video screens, such as described in co-pending provisional U.S. Pat. applications Ser. No. 60/186,520, filed Mar. 2, 2000, entitled INTERIOR REARVIEW MIRROR ASSEMBLY INCORPORATING A VIDEO SCREEN; Ser. No. 60/218,336, filed Jul. 14, 2000, entitled INTERIOR REARVIEW MIRROR ASSEMBLY INCORPORATING A VIDEO SCREEN; Ser. No. 60/234,412, filed Sep. 21, 2000, entitled VIDEO MIRROR SYSTEMS; Ser. No. 60/237,077, filed Sep. 29, 2000, entitled VIDEO MIRROR SYSTEMS; and Ser. No. 60/243,986, filed Oct. 27, 2000, entitled VIDEO MIRROR SYSTEMS INCORPORATING AN ACCESSORY MODULE, which are incorporated by reference in their entireties herein. Referring to FIG. 10, the numeral 110 generally designates a second embodiment of the vehicle mirror system of the present invention. As will be more fully described below, mirror system 110 incorporates a display area 112 which is formed by a display member 114, such as a display screen, such as a transparent or colored or the like molded plastic plate member which is adapted to display one or more display characters 115 for viewing by the driver or one or more occupants of the vehicle. Reference is made to U.S. Pat. No. 6,087,953 and U.S. patent application Ser. No. 09/244,726, filed Feb. 5, 1999, now U.S. Pat. No. 6,172,613, and Ser. No. 09/609, 100, filed Jun. 30, 2000, now U.S. Pat. No. 6,222,460, for suitable displays which are incorporated by reference herein by their entireties. In the illustrated embodiment, display member 114 is adapted to have a mechanical connection, such as a snap-fit or other mechanical connection, including a releasable mechanical connection, with mirror case or housing 116 of mirror system 110 so that display member 114 is readily interchangeable with other similar display members which have additional or different features to greatly enhance the in-line assembly of mirror System 110. By providing a mechanical connection, the sonic welding or heating staking or adhesive bonding (a typical assembly method for mirror assembly components that has been heretofore used) may be eliminated. Thus, the display member can be readily installed and is optionally removable for upgrade, replacement, or repair. In addition, the interchangeable display member eliminates the need for the retooling or retrofit of the whole mirror to add features and, instead, permits features to be added, removed, repaired, or replaced simply by removing and replacing or upgrading the display member. It should be understood that it may be desirable to mount the display member in a manner that would require the mechanical connectors to be broken to remove the display member.

As it will be understood from above, the mirror system of the present invention incorporates a display system that incorporates a display area. The display system may encompass an emitting display, such as a vacuum fluorescent display, an LED display, an electroluminescent display, cathode ray tube display, field emission display, E-ink display, or organic emitting polymer display element or the like or a non-emitting display, such as a liquid crystal display, or a tell-tale or icon formed on the display screen such as by back-lighting. For example, indicia may be formed, etched, or printed on a rear surface of the display screen or may be formed by selective actuation of light sources as well, with the light sources arranged to form the indicia when lit. For example, an array of light sources may be provided with selected light sources in the array being actuated to project patterns of light onto the display module which patterns form the indicia. Alternately, the display screen may be formed from a plate element formed from a resinous polymeric material, such as glass filled polycarbonate, with a dark pigment, such as black pigment, applied thereon. Optionally, the indicia may be formed by partial removal of the black pigment so that the indicia is not visible until back-lit and illuminated by one or more light sources. In addition, the display system may incorporate a multi-pixel display, including an addressable multi-pixel display, such as a flat-panel matrix-addressable, reconfigurable display element, capable of being reconfigured and capable of displaying scrolling text including alphanumeric text in various fonts and languages.

Referring to FIGS. 11A, 12, and 12A–12C, in the illustrated embodiment, display member 114 includes a body 136 with a wedge-shaped cross-section, similar to the previous embodiment, and a perimeter portion 140. In the illustrated embodiment, display member 114 comprises a display screen 114a, similar to display screen 36, and is mounted to a peripheral portion of housing 116, such as at a retaining rim or bezel 118, and forms (together with housing 116) an enlarged chin area 122 below reflective element 120 and bezel 118 of mirror system 110. As best seen in FIG. 11B, lower wall 116a of housing including an extended portion 116b, which forms a cavity 116c for optionally holding various electronic/electrical components, including circuit board 132 with one or more electrical/electronic components mounted thereon. Display member 114 is mounted to housing 116 and covers extended portion 116b to thereby form chin area 122. Alternatively, display member 114 may be located at an upper peripheral portion of housing 116, such as an eyebrow area, or at a side portion of housing 116.

Again referring to FIGS. 12A–12C, perimeter portion 140 of display member 114 includes one or more protecting tabs 144 with wedge-shaped ends forming camming surfaces 146. Tabs 144 align with corresponding receiving structures 148 provided in housing 116. In addition, perimeter portion 140 includes a plurality of receiving structures, such as elongate transverse openings 149, which receive projecting tabs 150 formed or provided on bezel 118. In this manner, display member 114 is mechanically connected with bezel 118 and lower wall 116a of housing 116.

As noted above, display member 114 comprises a display screen 114a and is formed from a plastic polymeric material, such as acrylic or polycarbonate. Alternatively, display member 114 may be formed from glass. For example, display screen 114a may have a refractive index in a range of 1.3 to 1.8. Similar to the previous embodiment, one or both of the display member material and the wedge-shaped cross-section of body 136 shifts the image of the display characters of display element 134, which is mounted to circuit board 132 in housing 116, so that the characters are aligned with the viewing area of display member 114 whereby the characters can be viewed more easily by the driver or one or more occupants of the vehicle. As described in reference to the first embodiment, display screen 114a preferably shifts the display characters, such as by one or more of refraction and diffraction, so that they substantially align with a central viewing area of display member 114. In addition, display member 114 is preferably formed from a tinted material, such as tinted plastic, so that display member 114 also provides a filter whereby display element 134 is not readily visible through display member 114. For further details of the type of display characters that can be displayed through display member 114, reference is made to the previous embodiment.

In addition to displaying display characters 115, display member 114 also includes one or more ports or openings 128a and 130a to receive one or more respective user-actuatable interface devices 128 and 130, such as user actuatable buttons or switches, which are preferably commonly mounted on circuit board 132, similar to the previous embodiment. Optionally, user-actuatable interface devices 128 and 130 are backlit by light sources also mounted on circuit board 132.

As would be understood from the description of the previous embodiment, numerous utility functions, vehicle systems, electrical or electronic devices may be incorporated into mirror system 110. For each combination of devices/functions/systems, display member 114 may be customized to suit the needs of the various displays or user interfaces that are desired. In this manner, display member 114 may provide one or more display functions and, further, may comprise a carrier for positioning (and optionally, supporting) various user interface devices, such as buttons, switches, cameras, lights, sensors, or the like.

Referring again to FIG. 10, housing 116 optionally includes a pair of light assemblies 150a, 150b which are adapted to project light through the lower portion of housing 116. In the illustrated embodiment, light assemblies 150a and 150b project light through openings 116a and 116b provided in lower wall of housing 116. Each light assembly 150a, 150b includes a cover 152a, 152b, a reflector 153a, 153b, and a light source 154a, 154b. Covers 152a and 152b are positioned and located in openings 116a and 116b by a projecting tab 155a, 155b and grooves 156a, 157a, 156b, 157b which align with respective grooves 116b, 117b and tabs 116c, 116d and 117c, 117d provided in lower wall 116a of housing 116. In addition, covers 152a, 152b include upwardly (as viewed in FIG. 10) fingers 159a, 159b, such as flexible fingers, which engage lower wall 116a of housing 116, for example, in a snap-fit arrangement to thereby simplify assembly of mirror system 110. Covers 152a and 152b are substantially identical and have substantially the same configuration so that when mirror system 110 is assembled, covers 152a and 152b can be interchanged which greatly enhances production time by eliminating the need for sorting of the covers and hence the need for segregation of the covers before assembly. This also reduces the cost of mirror system 110.

Covers 152a and 152b preferably comprise plastic lenses which are molded from a single tool, further reducing the cost of mirror system 110. As a result, covers 152a, 152b do not need to be mistake-proofed for left hand or right hand installation. "Mistake-proofed" as used herein means that the component is keyed or otherwise configured so that it can only be installed in one orientation. Typically, left and right light assemblies have covers that are "mistake-proofed" so that an assembler can only insert the left hand cover in the left hand opening and insert the right hand cover in the right hand opening of the mirror housing. Instead, covers 152a and 152b need only be "mistake-proofed" for proper alignment in either opening in housing 116. As can be seen, covers 152a, 152b are mounted in housing 116 in the same orientation. In addition, covers 152a and 152b may provide little, if any, optical function. For example, covers 152a and 152b may be clear or may be defused to exhibit minimal light directing or bending properties. In this manner, cover 152a is both optically and mechanically interchangeable with cover 152b. Furthermore, any differential light directing pattern is optional and may be substantially and nearly, wholly achieved through the design of reflectors 153a, 153b, which are positioned behind covers 152a and 152b (FIG. 11B).

Light sources 154a and 154b are supported in housing 116 and, in the illustrated embodiment, are mounted to circuit board 132. Each reflector 153a, 153b includes a reflective surface to direct light from the respective light sources 154a, 154b through openings 116a, 116a and covers 152a, 152b. Optionally, reflectors 153a, 153b may comprise plastic members which are coated with a metallic surface or otherwise provided with a reflective surface to direct light from light sources 154a, 154b. Optionally, reflectors 153a, 153b may be configured to produce an asymmetrical pattern. For examples of suitable reflectors, light sources, and alternate covers reference is made to U.S. Pat. Nos. 5,669,698; 4,646,210; 5,820,245; 6,000,823; 5,178,448; and U.S. patent applications Ser. No. 09/448,700, filed Nov. 24, 1999, by Skiver et al., entitled "REARVIEW MIRROR ASSEMBLY WITH ADDED FEATURE MODULAR DISPLAY", now U.S. Pat. No. 6,329,925 and Ser. No. 09/371,871 filed Aug. 6, 1999, now U.S. Pat. No. 6,183,199, all commonly assigned to Donnelly Corp. of Holland, Mich., the entire disclosures of which are incorporated by reference herein.

In the illustrated embodiment, reflective element 120 comprises a prismatic element which is moved between its day and night viewing positions by a toggle assembly 160. It should be understood that reflective element 120 may comprise an electro-optic reflective member, such as electrochromic reflective element, instead. For examples of suitable electrochromic reflective elements, reference is made to the previous embodiment. As best understood by FIG. 11A, housing 116 is mounted in the interior of a vehicle by a support 152, such as a dual ball mount support. In the illustrated embodiment, support 152 mounts housing 116 to the vehicle windshield, for example, with a break-away connection. As noted, support 152 comprises a dual-ball mount support with a first ball mount 154 and a mirror mount 155 on one end for mounting to the interior of a vehicle, such as to a mounting button on an inner surface of the windshield, and a second ball mount 156 on its other end which extends through forward facing opening 157 of housing 116 and is pivotally received in a bracket 158 provided in housing 116. Support 152 preferably incorporates a ball mount of the type described in patent application entitled "REARVIEW MIRROR MOUNTING ASSEMBLY", Ser. No. 09/470,791, filed Dec. 23, 1999, now U.S. Pat. No. 6,540,193, which is incorporated by reference herein in its entirety.

Figure 11A:
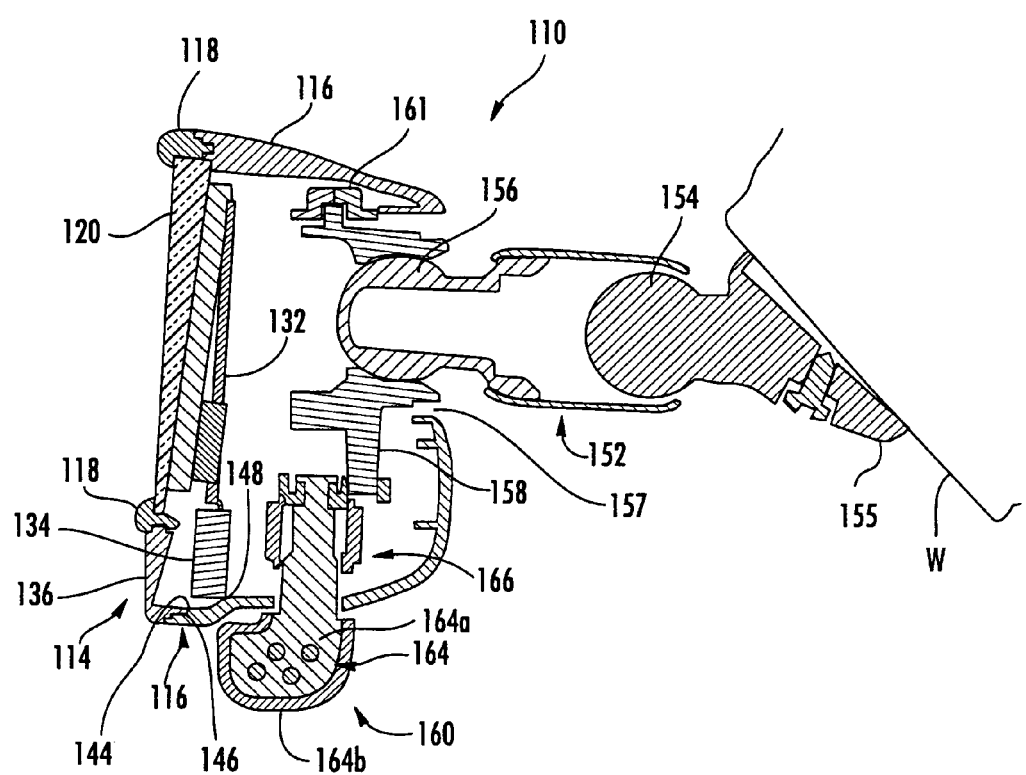
FIG. 11A is a cross-section taken along line XI—XI of FIG. 10.
Figure 11B:
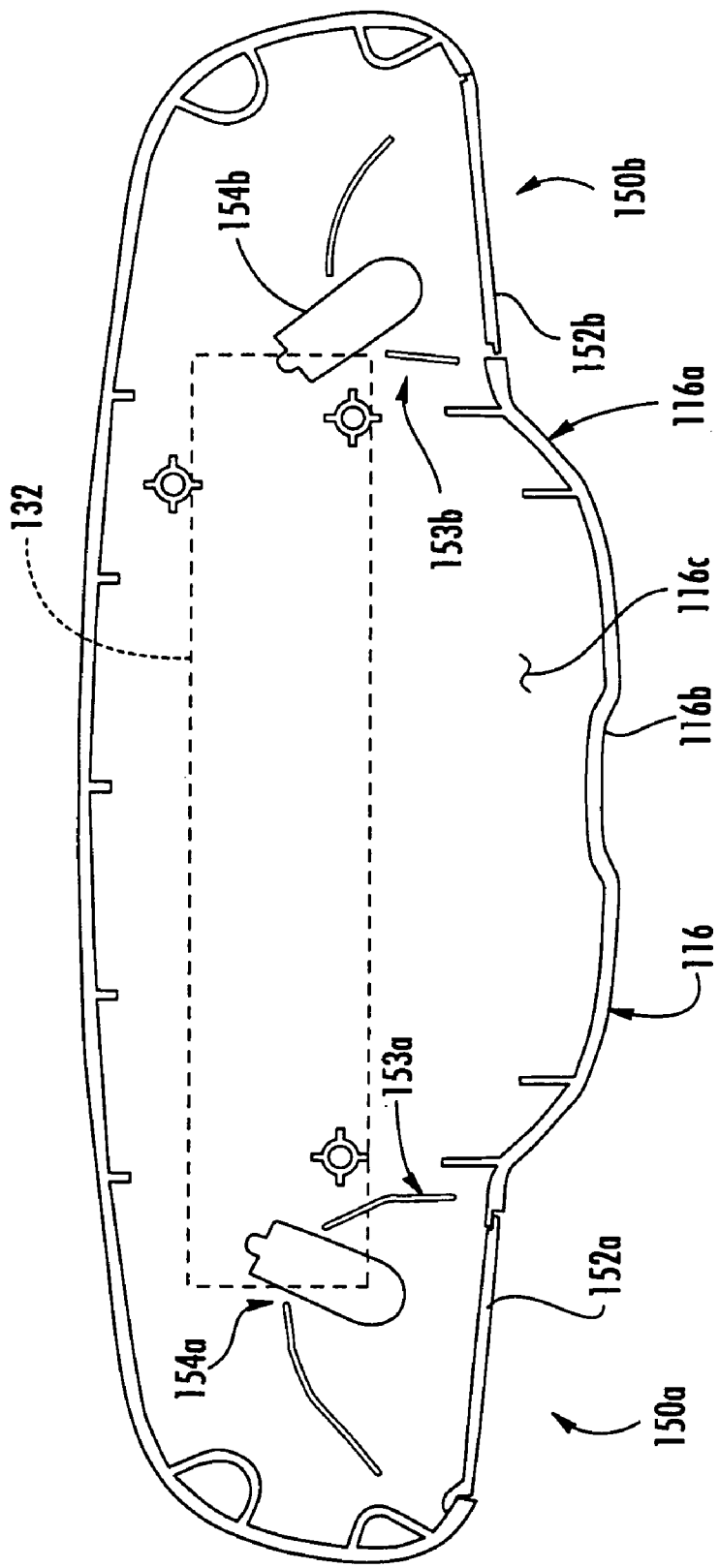
FIG. 11B is a front elevation view of the mirror casing and light assemblies of the mirror system of FIG. 10.
Figure 12:
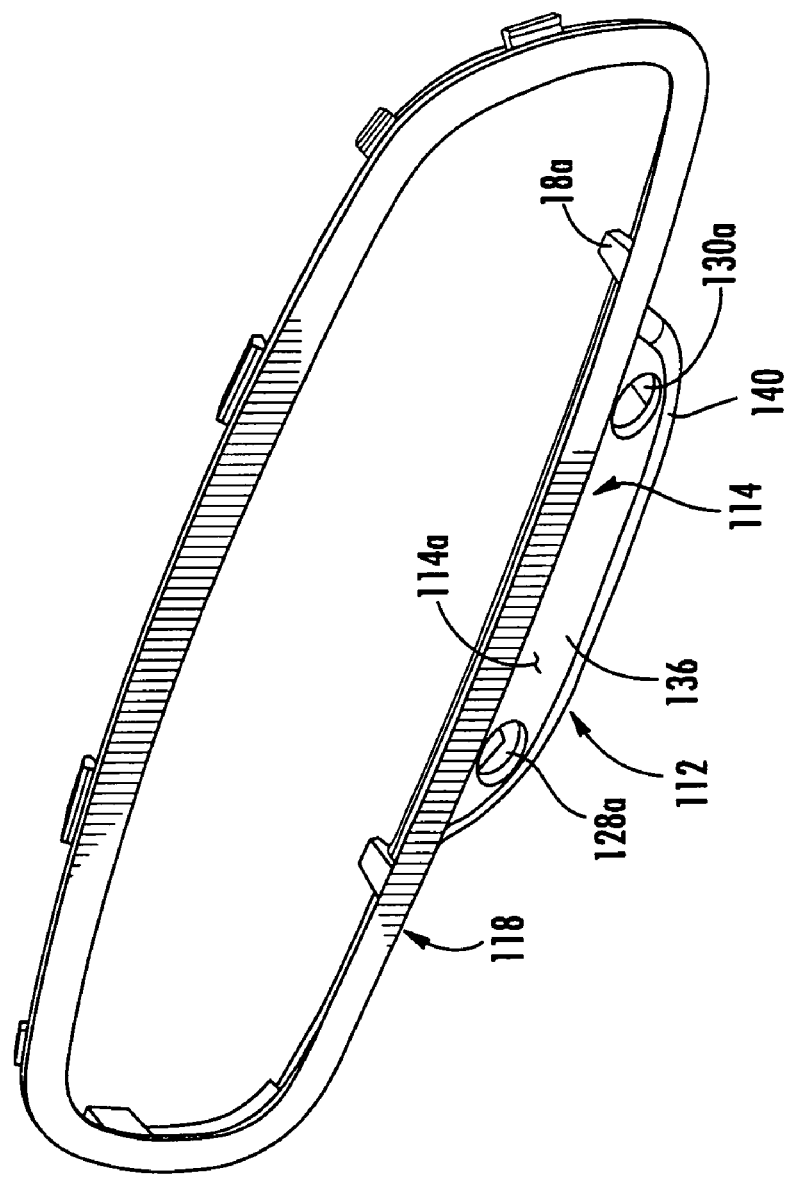
FIG. 12 is a perspective view of a retaining rim and display member of the vehicle mirror system of FIG. 10.
Figure 12B:
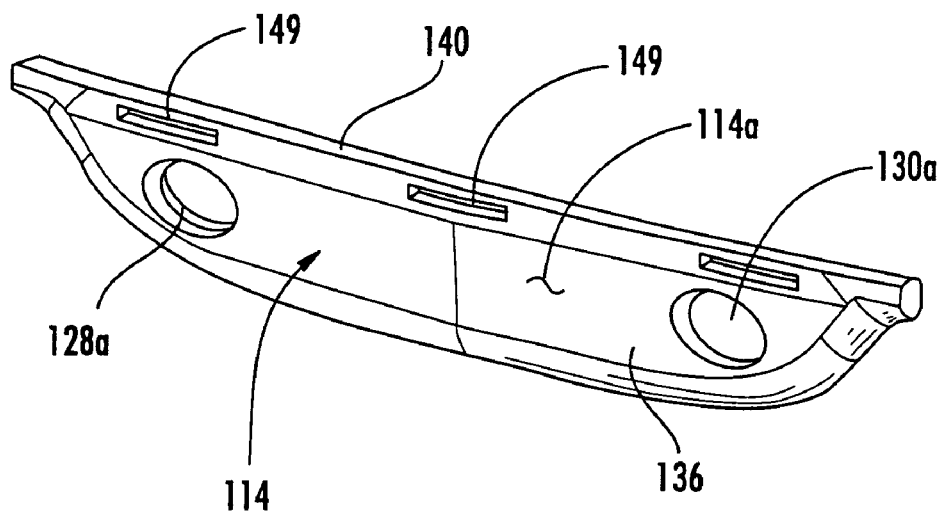
FIG. 12B is an enlarged front perspective view of the display member of FIG. 12.
Figure 12C:
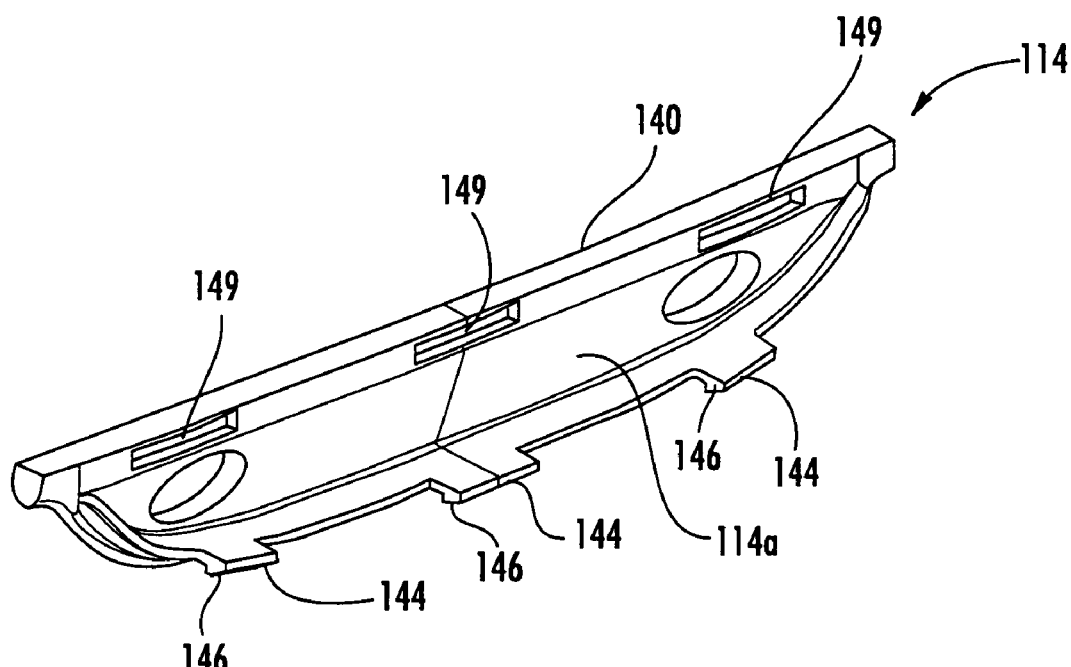
FIG. 12C is a rear perspective view of the display member of FIG. 12B.
Figure 13:
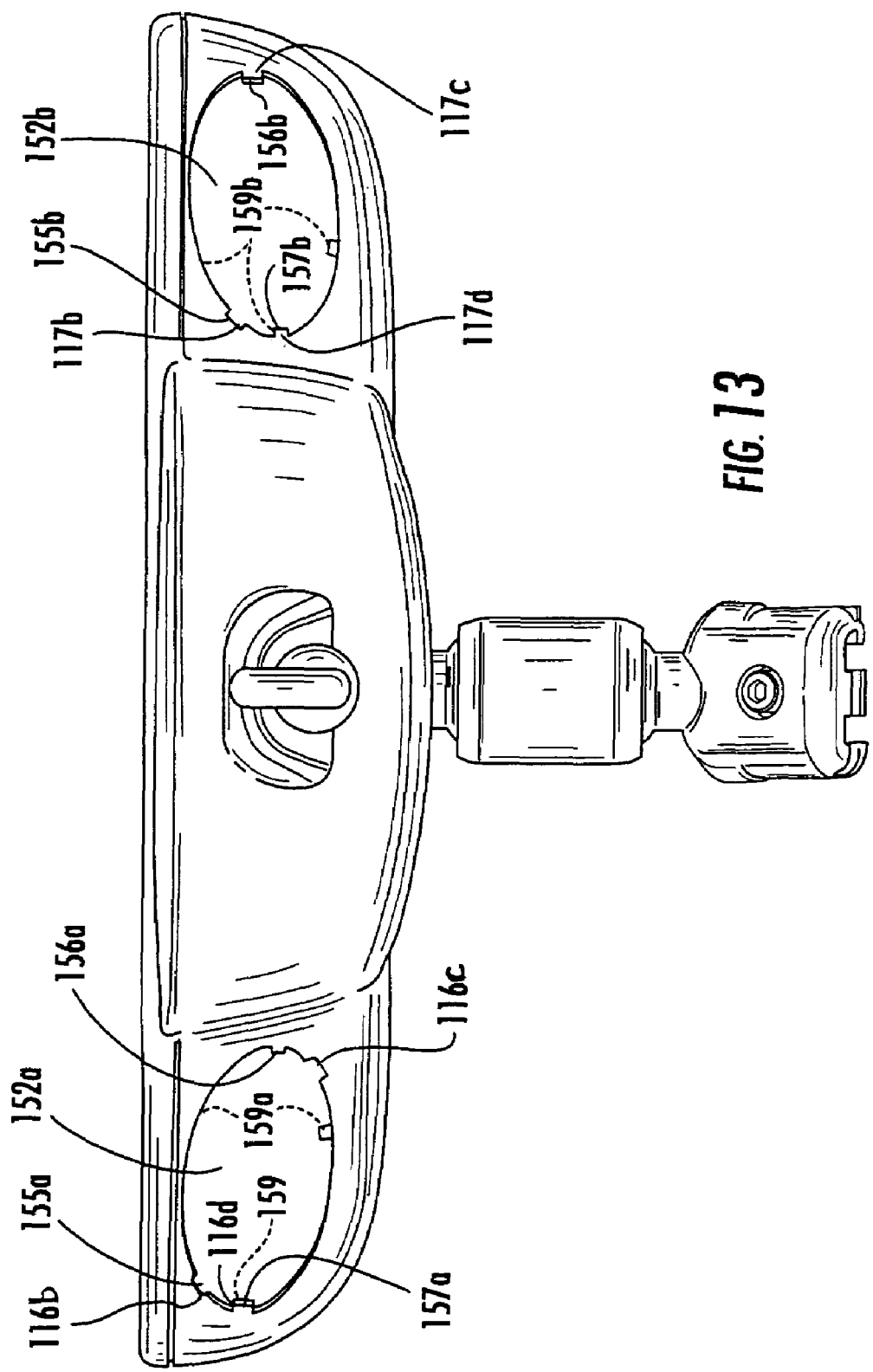
FIG. 13 is a bottom view of the mirror system of FIG; 10.
Figure 13A:
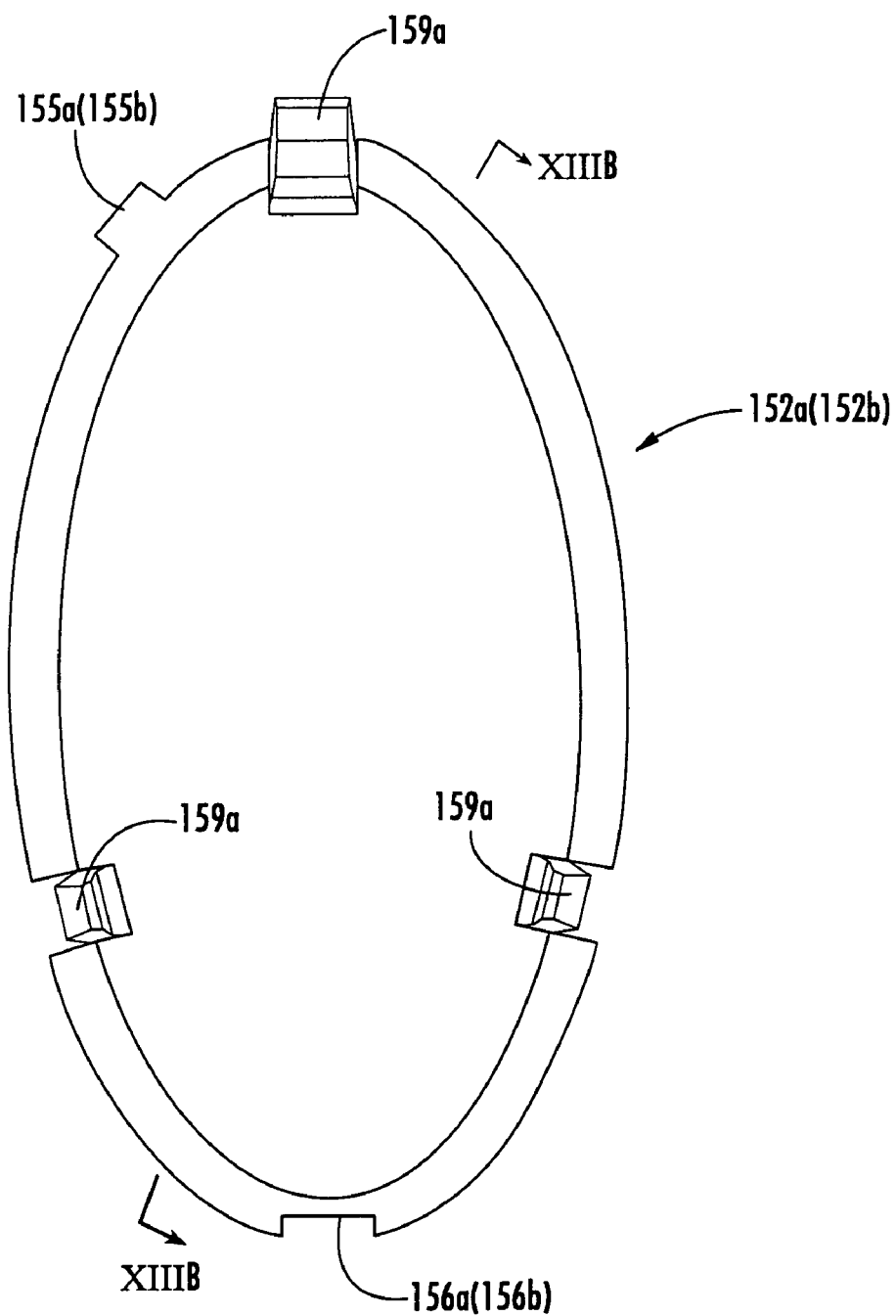
FIG. 13A is a plan view of the light cover of FIG. 13.
Figure 13B:
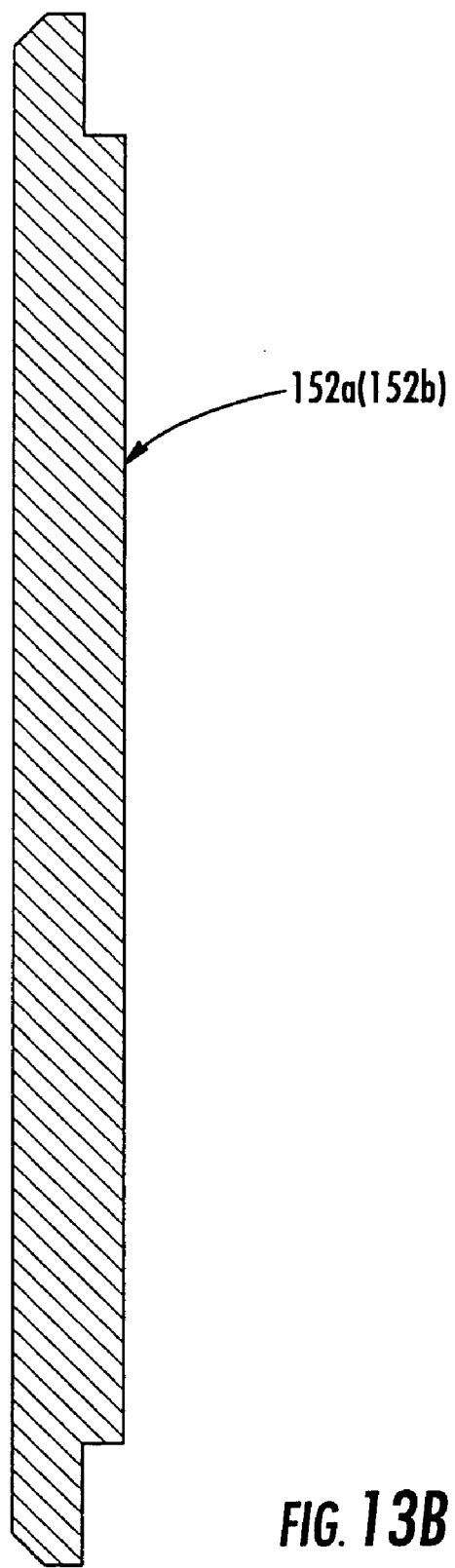
FIG. 13B is a cross-section taken along line XIIIB of XIIIB of FIG. 13A.
Figure 14:
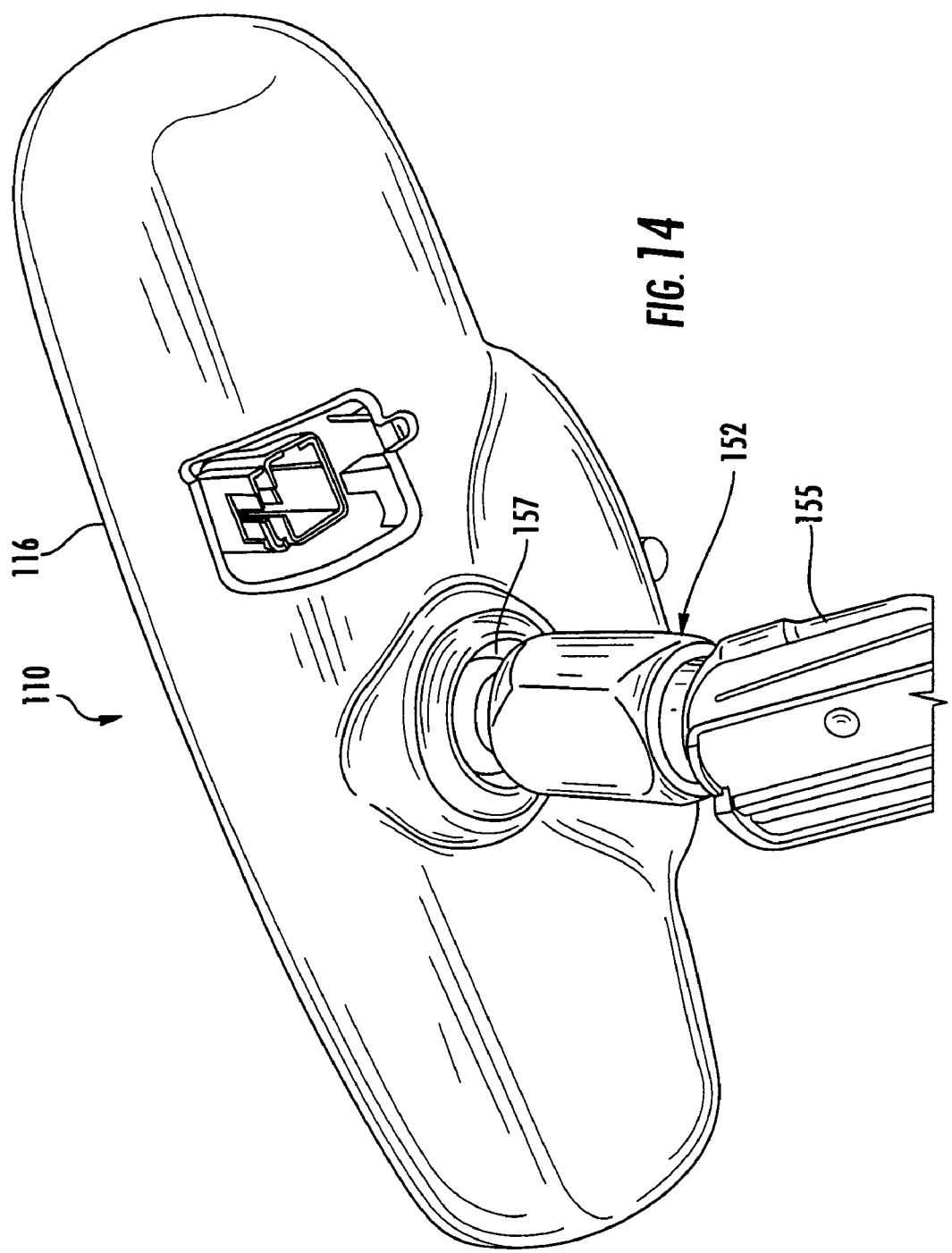
FIG. 14 is a rear view of the mirror system in FIG. 10.

As best seen in FIG. 11A, toggle assembly 160 pivots housing 116 about ball mount 156 of support 152. In the illustrated embodiment, toggle assembly 160 includes a rotating actuator or grasping member 164, such as a knob, and a cam 166, which is pivotally positioned within bracket 158. Bracket 158 in turn is pivotally mounted to a frame 161, which is rigidly mounted in housing 116. When actuator 164 is rotated, cam 166 induces pivoting of bracket 158 about frame 161 thereby pivoting housing 116, including bezel 118 and reflective element 120, relative to support 152. For further details of toggle assembly 160, reference is made to commonly assigned U.S. patent application Ser. No. 09/448,700, filed Nov. 24, 1999, by Skiver et al., entitled "REARVIEW MIRROR ASSEMBLY WITH ADDED FEATURE MODULAR DISPLAY", now U.S. Pat. No. 6,329,925, the disclosure of which is hereby incorporated by reference in its entirety. Alternately, toggle assembly 160 may comprise other toggle assemblies including a toggle assembly which incorporates a pivoting actuator that moves back and forth such as the type disclosed in commonly assigned U.S. patent application Ser. No. 09/533,127, filed Mar. 23, 2000, by Ralph A. Spooner and Jerry L. Beck, entitled "TOGGLE ASSEMBLY FOR REARVIEW MIRROR", now U.S. Pat. No. 6,318,870, the disclosure of which is hereby incorporated by reference in its entirety. As described in reference to the previous embodiment, numerous other mounting brackets or mounting arrangements may be used in mirror system 110.

In the illustrated embodiment, actuator or grasping member 164 preferably comprises a "soft" touch actuator to provide a more comfortable feel of the actuator or knob to the driver or occupant of the vehicle. Referring again to FIG. 11A, actuator 164 includes a body or skeletal structure 164a and an outer surface 164b. At least a portion, if not substantially all, of outer surface 164b comprises a softer material, such as rubber, plastic, or the like. For example, grasping member 164 may be formed using a two-shot molding method in which the skeletal structure is formed from a relatively rigid or hard material, such as a relatively rigid or hard plastic. The molded skeletal structure is then inserted into another tool where at least a portion of the outer surface is molded thereon with a softer plastic. For example, skeletal body 164a may comprise a thermoplastic or thermoset, such as nylon or the like, and preferably has a hardness or durometer of greater than about 70 Shore A durometer hardness. The outer surface may comprise a soft material, such as polyolefin or other similar thermoplastic materials, such as santoprene or the like, and preferably has a hardness or durometer of less than about 70 Shore A and, more preferably, less than about 50 Shore A. Alternately, outer surface 164b may be applied to body 164a, for example by an adhesive, or by mechanical means and/or may be formed or provided on a discrete or discrete portion of skeletal structure 164a. In addition, outer surface 164b may include surfacing, including a gripping surface, to enhance the operator's grip on grasping member 164.

Figure 15:
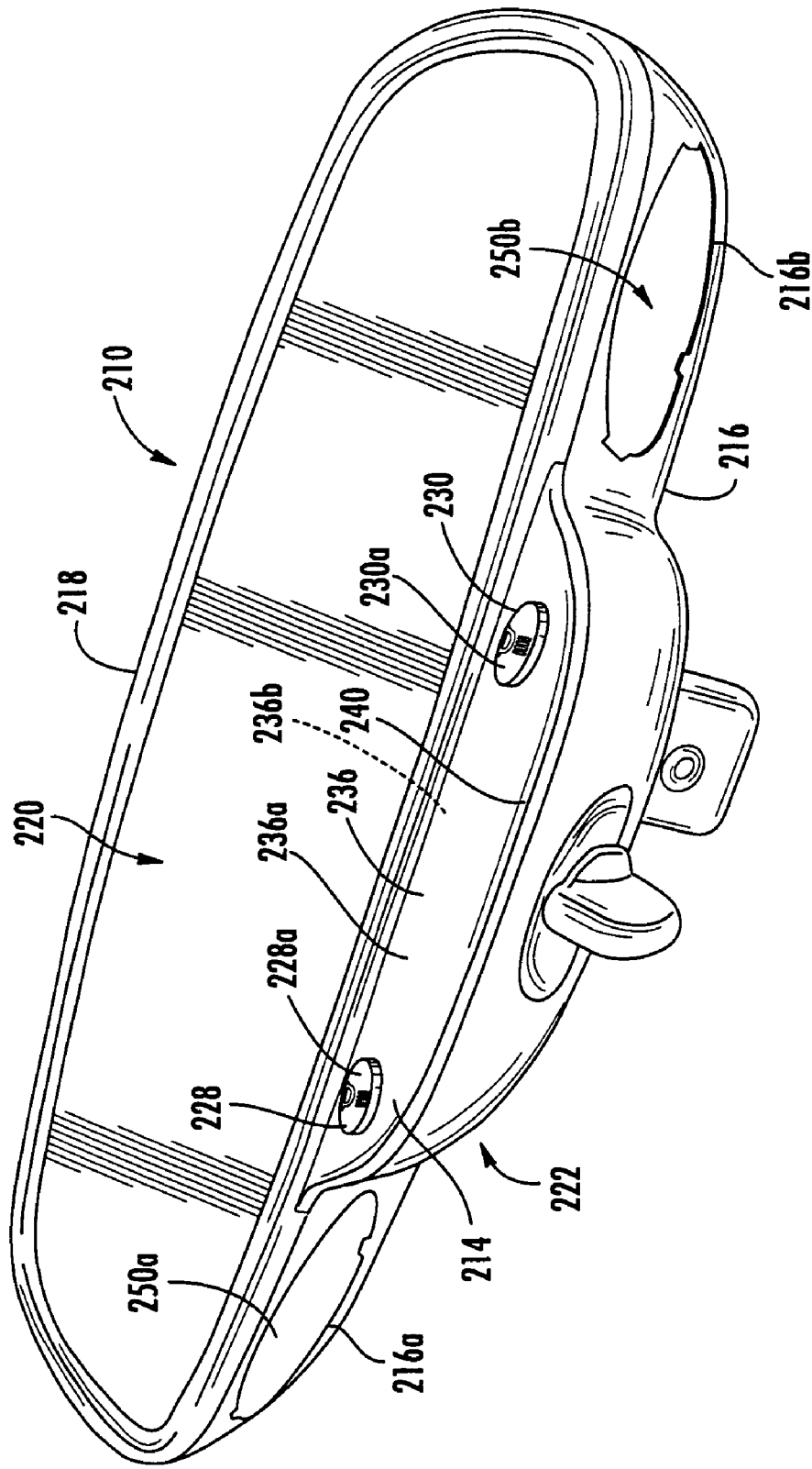
FIG. 15 is a front bottom perspective view of yet another embodiment of a vehicle system of the present invention.

Referring to FIG. 15, the numeral 210 generally designates a second embodiment of the vehicle mirror system of the present invention. Mirror system 210 includes a housing 216, with a retaining rim or bezel 218, and a reflective element 220, which is supported in housing 216. In the illustrated embodiment, reflective element 220 comprises a prismatic reflective element; however, reflective element 220 may comprise an electro-optic reflective element, such as electrochromic reflective element. Examples of suitable electro-optic elements are described in reference to the first embodiment.

In the illustrated embodiment, housing 216 includes an enlarged chin area 222 which extends below bezel 218 and reflective element 220. Chin area 222 includes a cover 214, which includes one or more openings or ports 228 and 230 to receive one or more respective user actuatable interface devices 228a and 230a, such as user actuatable buttons or switches. User actuatable interface devices 228a and 230a are preferably mounted on a circuit board (not shown), similar to the previous embodiment and are positioned by the circuit board to align with and extend through openings 228 and 230 so that user interface devices 228a and 230a are accessible for use by one or more occupants of the vehicle.

Cover 214 is similar to display member 114 of the previous embodiment and includes a body 236 and a perimeter portion 240. Optionally, body 236 may have a similar cross-section to body 236 in order to reduce costs, but in the illustrated embodiment, has a rectangular cross-section with generally parallel outer and inner surfaces 236a and 236b. Perimeter portion 240 includes mounting tabs 244 and receiving structures 249, such as elongate opening, which provide a snap-fit or mechanical connection with bezel 218 and housing 216 similar to the previous embodiment. Cover 214 comprises an opaque or solid element, which forms a blank and provides a mounting surface for various user actuatable interfaces, such as user actuatable interface devices 228a and 230a. The outline and configuration and mounting of cover member 214 is similar to display member 114; therefore, cover 214 may be readily interchanged with display member 114, for example during the assembly process. As a result, the same housing, retaining rim or bezel, reflective element, and/or toggle assembly, may be combined with numerous desired electronic/electrical features with the chin area, for example, being covered by cover 214 or display member 114 or similar variations thereof. Since the cover or display member are mechanically attached, the mirror system is easier to assemble and, furthermore, may provide for detachment of the respective display member or cover member for later repair, upgrade, or substitution.

Similar to the previous embodiment, mirror system 210 optionally includes a pair of light assemblies 250a and 250b, which respectively direct light through openings 216a and 216b provided in lower wall of housing 216. Mounted in openings 216a and 216b are covers 252a and 252b, respectively. Similar covers 252a and 252b are preferably identical similar to covers 152a and 152b of the previous embodiment. Alternately, openings 216a and 216b in housing 216 may be blanked out or provided with microphone modules, as previously described in reference to the first embodiment.

It can be appreciated from the foregoing that the present invention provides modular mirror system designs in which a plurality of common components may be assembled to form either a prismatic mirror assembly or an electro-optic interior mirror assembly. In addition, the mirror systems can be assembled with components, such as a cover or display member, that may be upgraded or replaced to suit the particular needs of the customer, without an overhaul of the whole mirror system. Furthermore, the concepts of the present invention may be incorporated into an exterior rearview mirror design.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property or privilege we claim are as follows:

1. A vehicle rearview mirror system comprising:
   a rearview mirror case having a reflective element, said mirror case being adapted to mount to a portion of a vehicle and including a carrier;
   said carrier located at a viewing location at said mirror case, said carrier being:
   a) mechanically connected to said mirror case by a plurality of tabs, said tabs engaging said case; or
   b) mechanically connected to said mirror case by a snap-fit connection; or
   c) releasably mechanically connected to said mirror case; and
   at least one user-actuatable interface device positioned at said carrier whereby at least one of a driver and an occupant of the vehicle can interface with said user-actuatable interface device, wherein said user actuatable interface device comprises a user actuatable button for actuating a vehicle function.

2. The vehicle mirror system according to claim 1, wherein said carrier is mechanically connected to said mirror case by a plurality of tabs, said tabs engaging said case.

3. The vehicle rearview mirror system according to claim 1, wherein said carrier is mechanically connected to said mirror case by a snap-fit connection.

4. The vehicle rearview mirror system according to claim 1, wherein said carrier is releasably mechanically connected to said mirror case.

5. The vehicle rearview mirror system according to claim 1, wherein said case includes a retaining rim, said carrier being mechanically connected to said mirror case at said retaining rim.

6. The vehicle rearview mirror system according to claim 5, wherein said carrier is mechanically connected to at least said retaining rim.

7. The vehicle rearview mirror system according to claim 1, wherein said mirror case includes one of a chin area below said reflective element and an eyebrow area above said reflective element, said carrier being mechanically connected to said case at one of said chin area and said eyebrow area.

8. The vehicle rearview mirror system according to claim 7, wherein said carrier is mechanically connected at said chin area.

9. The vehicle rearview mirror system according to claim 1, further comprising a display element having at least one display character emitting a pattern of light to form a display image, said carrier providing a display screen, said display element disposed behind said display screen, and said display screen displaying said at least one display image at said viewing location for viewing by at least one of a driver and an occupant of the vehicle.

10. The vehicle rearview mirror system according to claim 1, further comprising a light source, said light source illuminating said user-actuatable button.

11. The vehicle rearview mirror system according to claim 1, wherein said rearview mirror case comprises an interior rearview mirror case.

12. The vehicle rearview mirror system according to claim 1, further comprising a toggle assembly, said reflective element comprising a prismatic reflective element and being pivotable between day and night reflective positions by said toggle assembly.

13. The vehicle rearview mirror system according to claim 12, wherein said toggle assembly includes a grasping member, said grasping member including a base and an outer surface, said base comprising a first material, at least a portion of said outer surface comprising a second material having a lower hardness than said first material whereby said grasping member comprising a soft touch grasping member.

14. The vehicle rearview mirror system according to claim 13, wherein said second material has a material hardness of less than approximately 70 shore A Durometer.

15. The vehicle rearview mirror system according to claim 13, wherein said outer surface is formed from said second material.

16. The vehicle rearview mirror system according to claim 13, wherein said first material has a material hardness greater than approximately 70 Shore A Durometer.

17. The vehicle rearview mirror system according to claim 1, further comprising at least one light assembly projecting light through a lower portion of said mirror case.

18. A vehicle rearview mirror system comprising:
a rearview mirror case having a reflective element, said mirror case being adapted to mount to a portion of a vehicle and including a carrier;
said carrier located at a viewing location at said mirror case;
at least one user-actuatable interface device positioned at said carrier whereby at least one of a driver and an occupant of the vehicle can interface with said user-actuatable interface device; and
a display element having at least one display character emitting a pattern of light to form a display image, said carrier providing a display screen, said display element disposed behind said display screen, and said display screen displaying said at least one display image at said viewing location for viewing by at least one of a driver and an occupant of the vehicle, said display screen having a central viewing area generally aligned along a viewing axis, and display image on said display element being offset from said viewing axis, and said display screen shifting said display image on the display element to said central viewing area of said display screen.

19. The vehicle rearview mirror system according to claim 18, wherein said display element is mounted on a circuit board, said circuit board being supported in said case.

20. The vehicle rearview mirror system according to claim 18, wherein said display screen shifts said display image by at least one of refraction and diffraction.

21. The vehicle rearview mirror system according to claim 18, wherein said display screen includes an outer surface and an inner surface, said inner surface angled with respect to said outer surface whereby said image is shifted by refraction.

22. The vehicle rearview mirror system according to claim 21, wherein said display screen comprises a material having an index of refraction in a range of about 1.3 to 1.8.

23. The vehicle rearview mirror system according to claim 22, wherein said material has an index of refraction in a range of about 1.4 to 1.7.

24. The vehicle rearview mirror system according to claim 18, wherein said display screen is adapted to shift the image by diffraction.

25. A vehicle rearview mirror system comprising:
a rearview mirror case having a reflective element, said mirror case being adapted to mount to a portion of a vehicle and including a carrier;
said carrier located at a viewing location at said mirror case;
at least one user-actuatable interface device positioned at said carrier whereby at least one of a driver and an occupant of the vehicle can interface with said user-actuatable interface device, wherein said user actuatable interface device comprises a user actuatable button for actuating a vehicle function; and
a pair of light assemblies projecting light through a lower portion of said mirror case, said lower portion of said mirror case including a pair of openings, each of said light assemblies including a light source, a reflector element, and a cover, said reflector elements directing light from said light sources through said covers, and said covers of each of said light assemblies having substantially the same configuration and being positionable in said openings of said mirror case and being positioned in said openings in substantially the same orientation whereby said covers are interchangeable with one another.

26. The vehicle rearview mirror system according to claim 25, further comprising a display element, said carrier providing a display screen, and said display element disposed behind said display screen, and display screen displaying an image on said display element at a viewing location for viewing by one of a driver and an occupant of a vehicle.

27. The vehicle rearview mirror system according to claim 26, wherein said display screen shifts said image from said display element by at least one of diffraction and refraction.

28. A vehicle interior rearview mirror system comprising:
a rearview mirror case having a reflective element, said mirror case being adapted to mount to an interior portion of a vehicle;
a light emitting display element for displaying at least one display character emitting a pattern of light to form an image; and
a display screen being provided at said mirror case, said display screen being releasably mounted to said mirror case and including a viewing area, said display screen adapted to display said image of said display character at said viewing area, and said display screen being removeable for at least one of replacement, repair, and upgrade, wherein said display screen shifts said image from said light emitting display element by at least one of refraction and diffraction to align said image with a portion of said viewing area.

29. The vehicle interior rearview mirror system according to claim 28, further comprising at least one user-actuatable interface device at said display screen.

30. The vehicle interior mirror according to claim 29, wherein said user-actuatable interface device comprises a user-actuatable button.

31. The interior rearview mirror assembly according to claim 30, further comprising a light source, and said user-actuatable button being backlit by said light source.

32. The vehicle rearview mirror system according to claim 28, further comprising a circuit board, said circuit board supporting said light emitting display element.

33. The vehicle rearview mirror system according to claim 28, further comprising at least one light assembly projecting light through a lower portion of said mirror case.

34. The vehicle rearview mirror system according to claim 33, wherein said lower portion includes an opening, said light assembly projecting light through said opening.

35. The vehicle rearview mirror system according to claim 34, wherein said light assembly includes a cover and a light source, said cover positioned at said opening, and said light source projecting light through said cover.

36. The vehicle rearview mirror system according to claim 35, wherein said light assembly includes a reflector, and at least one of said reflector and said cover being adapted to direct the light in a desired light pattern.

37. The vehicle rearview mirror system according to claim 35, wherein said at least one light assembly comprises a pair of said light assembly, said covers of said light assemblies having substantially the same configuration whereby said covers are interchangeable.

38. The vehicle interior rearview mirror system according to claim 28, wherein said display screen comprises a spectral filter.

39. The vehicle rearview mirror system according to claim 25, wherein said carrier is mechanically coupled to said mirror case.

40. The vehicle interior rearview mirror system according to claim 28, wherein said display screen includes an outer surface and at least one inner surface angled with respect to said outer surface whereby said display screen shifts said image by refraction.

41. The vehicle interior rearview mirror system according to claim 40, wherein said screen has a wedge-shaped cross-section.

42. The vehicle interior rearview mirror system according to claim 40, wherein said display screen is formed from a material having an index of refractive in a range of 1.3 to 1.8.

43. The vehicle interior rearview mirror system according to claim 42, wherein said material has an index of refraction in a range of 1.45 to 1.65.

44. The vehicle interior rearview mirror system according to claim 28, wherein said display screen shifts said image by diffraction.

45. The vehicle interior rearview mirror system according to claim 44, wherein said display screen includes an inner surface and an outer surface, said inner surface being etched with a diffractive surface whereby said diffractive surfaces shifts said image.

46. The vehicle interior rearview mirror system according to claim 28, wherein said mirror case has a perimeter, said display screen is located at said perimeter of said mirror case.

47. The vehicle interior rearview mirror system according to claim 46, wherein said display screen is located below said reflective element.

48. The vehicle interior rearview mirror system according to claim 47, wherein said mirror case includes a chin area, said display screen forming a portion of said chin area.

49. The vehicle interior rearview mirror system according to claim 28, wherein said reflective element comprises a prismatic reflective element.

50. A prismatic interior rearview mirror system comprising:
  a mirror case having a reflective element;
  a support adapted to mount to an interior portion of a vehicle, said mirror case being pivotably mounted to said support;
  a toggle assembly adapted to pivot said mirror case and said reflective element about said support between a day position and a night position, said toggle assembly including a grasping member having a base and an outer surface, at least said base comprising a first material having a first hardness, at least a portion of said outer surface comprising a second material having a second hardness wherein said first hardness is greater than said second hardness; and
  a carrier, said carrier mounted to said mirror case and including at least one of a display screen and a user-actuatable interface device for use by an occupant of the vehicle.

51. The prismatic interior rearview mirror system according to claim 50, wherein said portion of said outer surface is molded onto said base.

52. The prismatic interior rearview mirror system according to claim 50, wherein said outer surface comprises said second material.

53. The prismatic interior rearview mirror system according to claim 50, wherein said second material has a hardness of less than about 70 Shore A Durometer.

54. The prismatic interior rearview mirror system according to claim 53, wherein said first material has a hardness of greater than about 70 Shore A Durometer hardness.

55. The prismatic interior rearview mirror system according to claim 50, wherein said carrier is mounted to said mirror case by a releasable mechanical connection.

56. The prismatic interior rearview mirror system according to claim 50, wherein said mirror case includes a chin area, said carrier being mounted at said chin area.

57. The prismatic interior rearview mirror system according to claim 56, wherein said carrier forms a portion of said chin area.

* * * * *

UNITED STATES PATENT AND TRADEMARK OFFICE
CERTIFICATE OF CORRECTION

| | |
|---|---|
| PATENT NO. | : 7,075,511 B1 |
| APPLICATION NO. | : 09/699780 |
| DATED | : July 11, 2006 |
| INVENTOR(S) | : Rick Mousseau, Barry W. Hutzel and Darry P. DeWind |

It is certified that error appears in the above-identified patent and that said Letters Patent is hereby corrected as shown below:

Column 1
Line 20, "Jonathon" should be --Jonathan--.
Line 27, "warming" should be --warning--.

Column 11
Line 54, Insert --(-- before "or".

Column 16
Line 51, "116a and 116b" should be --116a and 116a'--.
Line 55, "116a and 116b" should be --116a and 116a'--.

Column 17
Line 32, "116a, 116a" should be --116a, 116a'--.

Column 19
Line 27, Claim 2, Insert --rearview-- after "vehicle".

Column 21
Line 15, Claim 14, "shore" should be --Shore--.
Line 43, Claim 18, "and" should be --said--.

Column 22
Line 28, Claim 26, "and" should be --said--.
Line 56, Claim 30, "mirror" should be --rearview mirror system--.
Line 59, Claim 31, "assembly" should be --system--.
Line 62, Claim 32, Insert --exterior-- after "vehicle".
Line 65, Claim 33, Insert --exterior-- after "vehicle".

UNITED STATES PATENT AND TRADEMARK OFFICE
CERTIFICATE OF CORRECTION

PATENT NO. : 7,075,511 B1
APPLICATION NO. : 09/699780
DATED : July 11, 2006
INVENTOR(S) : Rick Mousseau, Barry W. Hutzel and Darry P. DeWind It is certified that error appears in the above-identified patent and that said Letters Patent is hereby corrected as shown below:

Column 23
Line 1, Claim 34, Insert --exterior-- after "vehicle".
Line 4, Claim 35, Insert --exterior-- after "vehicle".
Line 8, Claim 36, Insert --exterior-- after "vehicle".
Line 12, Claim 37, Insert --exterior-- after "vehicle".
Line 20, Claim 39, Insert --exterior-- after "vehicle".
Line 44, Claim 45, "surfaces" should be --surface--.

Signed and Sealed this

Thirteenth Day of January, 2009

JON W. DUDAS
*Director of the United States Patent and Trademark Office*